(12) United States Patent
Chen et al.

(10) Patent No.: US 11,888,596 B2
(45) Date of Patent: Jan. 30, 2024

(54) SYSTEM AND METHOD FOR NETWORK RELIABILITY

(71) Applicant: Huawei Technologies Co., Ltd., Shenzhen (CN)

(72) Inventors: Huaimo Chen, Bolton, MA (US); Donald Eggleston Eastlake, III, Apopka, FL (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/886,347

(22) Filed: Aug. 11, 2022

(65) Prior Publication Data

US 2022/0385530 A1 Dec. 1, 2022

Related U.S. Application Data

(63) Continuation of application No. PCT/US2021/017426, filed on Feb. 10, 2021.

(60) Provisional application No. 62/973,000, filed on Feb. 11, 2020.

(51) Int. Cl.
| | |
|---|---|
| *H04L 41/0893* | (2022.01) |
| *H04L 41/0695* | (2022.01) |
| *H04L 41/0668* | (2022.01) |
| *H04L 41/0686* | (2022.01) |

(52) U.S. Cl.
CPC ...... *H04L 41/0695* (2013.01); *H04L 41/0668* (2013.01); *H04L 41/0686* (2013.01); *H04L 41/0893* (2013.01)

(58) Field of Classification Search
None
See application file for complete search history.

(56) References Cited

U.S. PATENT DOCUMENTS

| | | | | |
|---|---|---|---|---|
| 2009/0182894 | A1* | 7/2009 | Vasseur | H04L 45/28 709/239 |
| 2010/0061301 | A1* | 3/2010 | Antal | H04L 45/60 370/328 |
| 2015/0023205 | A1* | 1/2015 | Vasseur | H04L 45/02 370/254 |

(Continued)

FOREIGN PATENT DOCUMENTS

| | | |
|---|---|---|
| CN | 107409093 A | 11/2017 |
| WO | 2019239189 A1 | 12/2019 |
| WO | 2021046565 A2 | 3/2021 |

OTHER PUBLICATIONS

Roux and Vasseur et al., Internet Draft, "OSPF Protocol Extensions for Path Computation Element (PCE) Discovery," draft-ieft-pce-disco-proto-ospf-08.txt., Oct. 2007 (Year: 2007).*

(Continued)

*Primary Examiner* — Benjamin Lamont
(74) *Attorney, Agent, or Firm* — Conley Rose, P.C.

(57) ABSTRACT

A method performed by a network controller for providing network reliability. The method includes employing an Interior Gateway Protocol (IGP) proxy configured to communicate controller information about the network controller to the one or more network elements using IGP (Link-State Advertisement (LSA) or Link State Protocol Data Unit (LSP)) with a Controllers TLV. The method uses the controller information for proper election of a primary controller in the event of a network failure.

16 Claims, 39 Drawing Sheets

(56) References Cited

U.S. PATENT DOCUMENTS

| | | | | |
|---|---|---|---|---|
| 2015/0103844 A1* | 4/2015 | Zhao | .................. | H04L 45/42 |
| | | | | 370/410 |
| 2016/0248658 A1 | 8/2016 | Patel et al. | | |
| 2016/0366051 A1* | 12/2016 | Chen | .................. | H04L 45/02 |
| 2017/0237605 A1 | 8/2017 | Koponen et al. | | |
| 2018/0034730 A1 | 2/2018 | Zhao | | |
| 2018/0254972 A1* | 9/2018 | Patel | .................. | H04L 45/74 |

OTHER PUBLICATIONS

Abdullah, Z., et al., "Segment Routing in Software Defined Networks: A Survey", IEEE Communications Surveys & Tutorials, vol. 21, No. 1, First Quarter 2019, 161 pages.

Chen, H., et al., "IGP for Network High Availability," Network Working Group, draft-chen-lsr-ctr-availability-00, Mar. 8, 2020, 14 pages.

\* cited by examiner

```
    0              1302  1                    2    1304              3
    0 1 2 3 4 5 6 7 8 9 0 1 2 3 4 5 6 7 8 9 0 1 2 3 4 5 6 7 8 9 0 1
   +-+-+-+-+-+-+-+-+-+-+-+-+-+-+-+-+-+-+-+-+-+-+-+-+-+-+-+-+-+-+-+-+
   |           Type   1310        |          Length = 12   1314    |
   +-+-+-+-+-+-+-+-+-+-+-+-+-+-+-+-+-+-+-+-+-+-+-+-+-+-+-+-+-+-+-+-+
   |    Flags     |1|  Position = 1 |NoControllers=1|OldPosition = 1|
   +-+-+-+-+-+-+-+-+-+-+-+-+-+-+-+-+-+-+-+-+-+-+-+-+-+-+-+-+-+-+-+-+
   |   1306       1308 Reserved ← 1316        1312 |    Priority   |
   +-+-+-+-+-+-+-+-+-+-+-+-+-+-+-+-+-+-+-+-+-+-+-+-+-+-+-+-+-+-+-+-+
   |              1320 → Controller A's ID              1318       |
   +-+-+-+-+-+-+-+-+-+-+-+-+-+-+-+-+-+-+-+-+-+-+-+-+-+-+-+-+-+-+-+-+

Controllers TLV in LSA originated by A after B or link to B fails
```

1402                      1404
0                   1                   2                   3
0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|            Type  1410         |         Length = 12  1414     |
+-+-+-+-+-+-+-+-+-+-+-+-+-+-+-+-+-+-+-+-+-+-+-+-+-+-+-+-+-+-+-+-+
|   Flags    |0| Position = 1   |NoControllers=1|OldPosition = 2|
+-+-+-+-+-+-+-+-+-+-+-+-+-+-+-+-+-+-+-+-+-+-+-+-+-+-+-+-+-+-+-+-+
|   1406       1408 Reserved← 1416       1412     |   Priority   |
+-+-+-+-+-+-+-+-+-+-+-+-+-+-+-+-+-+-+-+-+-+-+-+-+-+-+-+-+-+-+-+-+
|              1420→ Controller B's ID       1418               |
+-+-+-+-+-+-+-+-+-+-+-+-+-+-+-+-+-+-+-+-+-+-+-+-+-+-+-+-+-+-+-+-+

Controllers TLV in LSA originated by B after A or link to A fails
```

*FIG. 14*

Controllers TLV in LSA originated by B after A fails

```
                               2000B 0             2002B   1                  2   2004B              3
    0 1 2 3 4 5 6 7 8 9 0 1 2 3 4 5 6 7 8 9 0 1 2 3 4 5 6 7 8 9 0 1
    +-+-+-+-+-+-+-+-+-+-+-+-+-+-+-+-+-+-+-+-+-+-+-+-+-+-+-+-+-+-+-+-+
    |            Type   2010B     |        Length = n*4+8  2014B    |
    +-+-+-+-+-+-+-+-+-+-+-+-+-+-+-+-+-+-+-+-+-+-+-+-+-+-+-+-+-+-+-+-+
    |   Flags   |0|  Position = 2 |NoControllers=n|OldPosition = 2|
    +-+-+-+-+-+-+-+-+-+-+-+-+-+-+-+-+-+-+-+-+-+-+-+-+-+-+-+-+-+-+-+-+
    |  2006B    2008B Reserved  2016B    2012B    |    Priority    |
    +-+-+-+-+-+-+-+-+-+-+-+-+-+-+-+-+-+-+-+-+-+-+-+-+-+-+-+-+-+-+-+-+
    |                    Controller A's ID            2018B         |
    +-+-+-+-+-+-+-+-+-+-+-+-+-+-+-+-+-+-+-+-+-+-+-+-+-+-+-+-+-+-+-+-+
    :              2020B                :                           :
    +-+-+-+-+-+-+-+-+-+-+-+-+-+-+-+-+-+-+-+-+-+-+-+-+-+-+-+-+-+-+-+-+
    |                    Controller N's ID                          |
    +-+-+-+-+-+-+-+-+-+-+-+-+-+-+-+-+-+-+-+-+-+-+-+-+-+-+-+-+-+-+-+-+

Controllers TLV in LSA originated by B
```

0         2502               1    2504              2506        2508    2510     3
   0 1 2 3 4 5 6 7 8 9 0 1 2 3 4 5 6 7 8 9 0 1 2 3 4 5 6 7 8 9 0 1
  +-+-+-+-+-+-+-+-+-+-+-+-+-+-+-+-+-+-+-+-+-+-+-+-+-+-+-+-+-+-+-+-+
  |     Type      |  Length = 14  |  Flags  2516  |1|  Position = 1 |
  +-+-+-+-+-+-+-+-+-+-+-+-+-+-+-+-+-+-+-+-+-+-+-+-+-+-+-+-+-+-+-+-+
  |NoControllers=2|OldPosition = 1|   A's Priority |    Reserved    |
  +-+-+-+-+-+-+-+-+-+-+-+-+-+-+-+-+-+-+-+-+-+-+-+-+-+-+-+-+-+-+-+-+
  |   2512              2514    Controller A's ID              2518 |
  +-+-+-+-+-+-+-+-+-+-+-+-+-+-+-+-+-+-+-+-+-+-+-+-+-+-+-+-+-+-+-+-+
  |                             Controller C's ID  — 2520           |
  +-+-+-+-+-+-+-+-+-+-+-+-+-+-+-+-+-+-+-+-+-+-+-+-+-+-+-+-+-+-+-+-+

Controllers TLV in LSP originated by A in Group 1 as Primary Group
```

FIG. 25

```
 0              2602    1                   2    2604             3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|          Type    2610       |        Length = 12    2614      |
+-+-+-+-+-+-+-+-+-+-+-+-+-+-+-+-+-+-+-+-+-+-+-+-+-+-+-+-+-+-+-+-+
|   Flags   |0|  Position = 1 |NoControllers=1|OldPosition = 3|
+-+-+-+-+-+-+-+-+-+-+-+-+-+-+-+-+-+-+-+-+-+-+-+-+-+-+-+-+-+-+-+-+
|  2606      2608  Reserved ← 2616      2612    |  C's Priority |
+-+-+-+-+-+-+-+-+-+-+-+-+-+-+-+-+-+-+-+-+-+-+-+-+-+-+-+-+-+-+-+-+
|              2620 → Controller C's ID         2618            |
+-+-+-+-+-+-+-+-+-+-+-+-+-+-+-+-+-+-+-+-+-+-+-+-+-+-+-+-+-+-+-+-+

Controllers TLV in LSA originated by C in Group 1
```

*FIG. 26*

SYSTEM AND METHOD FOR NETWORK RELIABILITY

CROSS-REFERENCE TO RELATED APPLICATIONS

This application is a continuation of International Application No. PCT/US2021/017426 filed on Feb. 10, 2021 by Futurewei Technologies, Inc., and titled "System and Method for Network Reliability," which claims the benefit of U.S. Provisional Application No. 62/973,000 filed Feb. 11, 2020 by Huaimo Chen, et al., and titled "System and Method for Network Reliability." Both of the aforementioned applications are hereby incorporated by reference.

TECHNICAL FIELD

The present disclosure is generally related to network management, and in particular to various embodiments of systems and methods providing for network reliability.

BACKGROUND

Software-defined network or networking (SDN) is an approach to networking that uses software-based controllers or application programming interfaces (APIs) to communicate with underlying hardware infrastructure and direct traffic on a network. SDN separates the network control plane of network devices from the underlying data plane that forwards network traffic to enable more automated provisioning and policy-based management of network resources. Network switches become simple forwarding devices and the control logic is implemented in a logically centralized controller.

SUMMARY

A first aspect relates to a method performed by a network controller configured as a primary network controller of a controller cluster. The controller cluster includes the primary network controller and a non-primary network controller (e.g., a secondary network controller). The primary controller is configured to control a network. The method includes employing an Interior Gateway Protocol (IGP) proxy in the primary network controller that is configured to communicate controller information about the primary network controller to one or more network elements in the network using IGP. The method, via the IGP proxy of the network controller, establishes an IGP adjacency relationship between the IGP proxy of the primary network controller and the one or more network elements in the network. The IGP proxy of the primary network controller advertises controller information about the primary network controller to the one or more network elements. The method includes, detecting, using the IGP proxy of the primary network controller, a communication failure with the non-primary network controller in the controller cluster. The IGP proxy of the network controller advertises updated controller information about the primary network controller to the one or more network elements, the updated controller information reflecting a change to the controller information caused by the communication failure. The method includes maintaining the primary network controller as the primary network controller to control the network.

A second aspect relates to a method performed by a network controller configured as a non-primary network controller of a controller cluster. The controller cluster includes a primary network controller and the non-primary network controller. The primary network controller is configured to control a network. The method includes employing an Interior Gateway Protocol (IGP) proxy in the non-primary network controller that is configured to communicate controller information about the non-primary network controller to one or more network elements in the network using IGP. The method, via the IGP proxy of the non-primary network controller, establishes an IGP adjacency relationship between the IGP proxy of the non-primary network controller and the one or more network elements in the network. The IGP proxy of the non-primary network controller advertises controller information about the non-primary network controller to the one or more network elements. The method includes, detecting, using the IGP proxy of the non-primary network controller, a communication failure with the primary controller in the controller cluster. The IGP proxy of the non-primary network controller advertises updated controller information about the non-primary network controller to the one or more network elements, the updated controller information reflecting a change to the non-primary controller information caused by the communication failure. The method includes determining that the primary network controller has failed. The IGP proxy of the non-primary network controller advertises second updated controller information about the non-primary network controller to the one or more network elements in response to the primary network controller having failed. The second updated controller information promotes the non-primary network controller to the primary network controller of the controller cluster.

A third aspect relates to a method performed by a network controller of a controller cluster configured to control a network. The controller cluster includes a plurality of network controllers. The method includes employing an Interior Gateway Protocol (IGP) proxy configured to communicate controller information about the network controller to one or more network elements in the network using IGP. The method, via the IGP proxy of the network controller, establishes an IGP adjacency relationship between the IGP proxy of the network controller and one or more network elements in the network. The IGP proxy of the network controller advertises controller information about the network controller to the one or more network elements. The method includes, detecting, using the IGP proxy of the network controller, a communication failure within the controller cluster that splits in the controller cluster into a plurality of controller groups. The IGP proxy of the network controller advertises updated controller information about the network controller to the one or more network elements, the updated controller information reflecting a change to the controller information caused by the communication failure. The method includes determining that the network controller is part of an elected primary group of the plurality of controller groups. The IGP proxy of the network controller advertises a second updated controller information about the network controller to the one or more network elements when the network controller is an intent primary controller of the elected primary group. The second updated controller information indicating that the network controller is the current active primary network controller of the network.

Optionally, in a first implementation according to the any of the preceding aspects, determining whether the primary network controller has failed includes using a link state database (LSDB) in the IGP proxy to determine whether the IGP proxy of the primary controller is advertising the controller information to the one or more network elements in the network.

Optionally, in a second implementation according to the any of the preceding aspects or implementation thereof, the IGP adjacency relationship between the IGP proxy of the network controller and one or more network elements in the network is established over a control channel.

Optionally, in a third implementation according to the any of the preceding aspects or implementation thereof, the controller information is included in a Controllers Type/Length/Value (TLV).

Optionally, in a fourth implementation according to the any of the preceding aspects or implementation thereof, the Controllers TLV is included in one of an Open Shortest Path First Version 2 (OSPFv2) Router Informational (RI) Opaque Link-State Advertisement (LSA), OSPFv3 RI Opaque LSA, or an Intermediate System to Intermediate System (IS-IS) Link State Protocol Data Unit (LSP).

Optionally, in a fifth implementation according to the any of the preceding aspects or implementation thereof, the Controllers TLV includes a bit field and a position field, the bit field when set indicates that a position indicated in the position field is the position of a current active primary controller.

Optionally, in a sixth implementation according to the any of the preceding aspects or implementation thereof, the Controllers TLV includes a number of controllers' field that indicates a number of controllers connected to the network controller advertising the Controllers TLV.

Optionally, in a seventh implementation according to the any of the preceding aspects or implementation thereof, the Controllers TLV includes an old position field that indicates a position of the network controller in the controller cluster prior to the controller cluster being split.

Optionally, in an eighth implementation according to the any of the preceding aspects or implementation thereof, the Controllers TLV includes a priority field that indicates a priority of the network controller to be elected as a primary network controller.

Optionally, in a ninth implementation according to the any of the preceding aspects or implementation thereof, the Controllers TLV includes Controller Identifier (ID) field that includes the controller ID of all controllers in the controller cluster.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 13 is an example of a Controllers TLV in accordance with an embodiment of the present disclosure.

FIG. 14 is an example of a Controllers TLV in accordance with an embodiment of the present disclosure.

FIG. 20B is an example of a Controllers TLV in accordance with an embodiment of the present disclosure.

FIG. 25 is an example of a Controllers TLV in accordance with an embodiment of the present disclosure.

FIG. 26 is an example of a Controllers TLV in accordance with an embodiment of the present disclosure.

DETAILED DESCRIPTION

Figure 1:
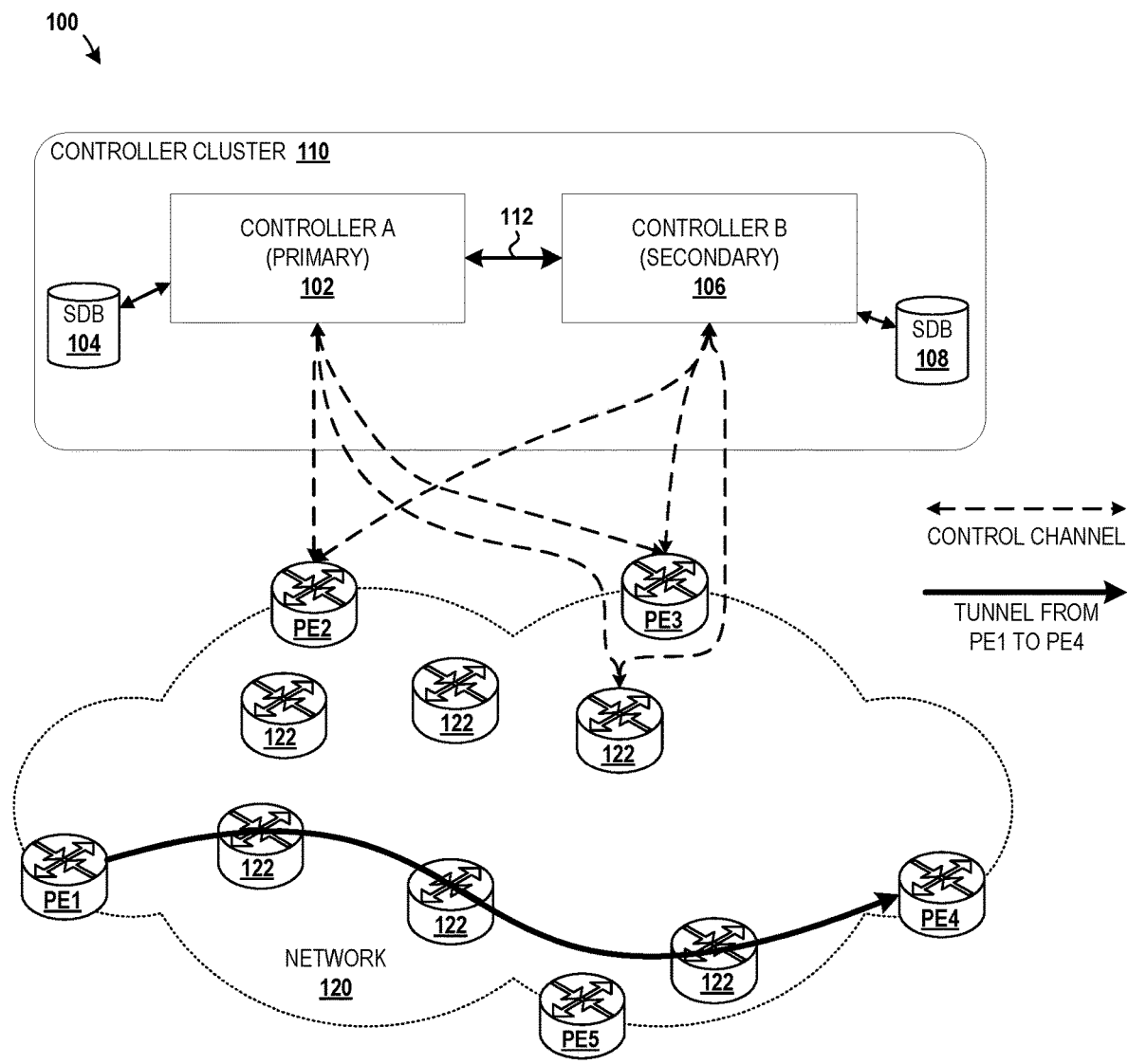
FIG. 1 is a schematic diagram illustrating a software-defined network controlled by a controller cluster that includes two network controllers in accordance with an embodiment of the present disclosure.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In a software defined network (SDN), every network element (NE) in the network is controlled by a controller cluster, which normally consists of two or more controllers working together to control the network (i.e., the network elements). For controller clusters that include only two controllers (i.e., primary and secondary controller), a connection failure between the two controllers may result in having two separated controllers attempting to operate as a primary controller. For instance, upon detecting the connection failure, the secondary controller thinks that the primary controller is dead and promotes itself as the new primary controller. This can result in two primary controllers in the control cluster when the primary controller is not dead, which can result in network reliability issues. For the controller cluster that includes more than two controllers (i.e., primary controller, secondary controller, third controller, and so on), one or more connection and/or controller failures in the cluster may split the cluster into a number of separated controller groups. Due to the connection failures, these groups are unaware of each other, do not know which group should be elected as the one primary group to control the network. This can result in two or more groups being elected as the primary group to control the network, which can also result in network reliability issues.

To address the above issues, and other issues, the present disclosure describes various systems and methods for providing network reliability by enabling separated controllers or controller groups to still be able to communicate so that they have knowledge of each other through the use of Interior Gateway Protocol (IGP) with new extensions. IGP is a type of protocol used for exchanging routing information between gateways (commonly routers) within an autonomous system (AS). This routing information can then be used to route network-layer protocols like Internet Protocol (IP) packets. An AS is a collection of connected IP routing prefixes under the control of one or more network operators on behalf of a single administrative entity or domain that presents a common, clearly defined routing policy to the internet (for example, a system of corporate local area networks). There are different types of IGP. Type 1 IGP is referred to as a link-state routing protocol. The link-state routing protocol is performed by every switching node in the network (i.e., nodes that are prepared to forward packets; in the Internet, these are called routers). The basic concept of link-state routing is that every node constructs a map of the connectivity to the network, in the form of a graph, showing which nodes are connected to which other nodes. Each node then independently calculates the best logical path or the best next hop interface from it to every possible destination in the network. Each collection of best paths will then form each node's routing table.

Examples of link-state routing protocols (or Type 1 IGP) include OSPF routing protocol and IS-IS. OSPF uses Link State Advertisement (LSA) to exchange routing information between routers. Each router within an area will flood a type 1 LSA (also called router LSA) within the area. LSA's are encapsulated behind an OPSF packet and then an IP packet. An area is a logical group of OSPF-based networks, routers, and links that have the same area number. Routers that belong to the same area keep a topological database for the entire area. The router LSA contains information about directly connected links in the area to which the router belongs (e.g., a list with all the directly connected links of this router). They are flooded to all routers in that area. When the router is an ABR (Area Border Router), it generates type 1 LSAs for all the areas to which it is connected and sends those LSAs to all neighbors in corresponding areas. OSPF has been modified since the first version. The two most common versions in use are OSPF Version 2 (OSPFv2) and OSPF Version 3 (OSPFv3). OSPFv2 is the version for the fourth version of the Internet Protocol (IPv4), whereas OSPFv3 is the version for IPv6.

IS-IS uses Link State Protocol Data Unit (LSP) to exchange routing information between routers. LSP is a packet of information generated by a network router in a link state routing protocol that lists the router's neighbors (i.e., local link-state information describing connected links, neighbor routers, IP subnets, related metric information, and so forth). Copies of the LSP are distributed to all routers in a specific area through a process referred to as flooding. Ultimately, all routers in an area obtain every other router's LSP and synchronize their databases.

As stated above, the present disclosure describes various systems and methods for providing network reliability by enabling separated controllers or controller groups to communicate through the use of IGP with new extensions so that they have knowledge of each other. In an embodiment, every controller in a controller cluster uses an IGP (OSPF or IS-IS) as a proxy, which connects to one or more network elements running the IGP. Each controller advertises that it is a controller along with other information such as, but not limited to, its position and the number of controllers (including itself) in its group by using the IGP extensions. The disclosed embodiments enable correct election of a new primary controller or controller group when the controller cluster is split due to one or more failures within the cluster. As a result, the disclosed embodiments improve the reliability of controller cluster and the reliability of the SDN.

FIG. 1 is a schematic diagram illustrating a software-defined network (SDN) 100 in accordance with an embodiment of the present disclosure. The SDN 100 includes a network 120 comprising a plurality of network elements (devices) including network elements 122 and one or more network provider edge (PE) devices (e.g., PE1-PE5). The network elements 122 may be, but not limited to, network routers or switches that enable the forwarding of data packets. For example, a tunnel/path can be configured between network ingress router PE1 to network egress router PE4 for transporting data packets through the network 120. In an embodiment, the network 120 is controlled by a controller cluster 110 that includes two network controllers, Controller A 102 and Controller B 106. In the depicted embodiment, Controller A 102 is set as the primary controller and Controller B 106 is set as a secondary (backup) controller. Controller A 102 provides the control logic over control channels to the network elements for enabling the provisioning and management of network resources within the network 120. By extricating the control logic to Controller A 102 in the controller cluster 110, the network elements 122 become simple forwarding devices.

As shown in FIG. 1, during normal operations (i.e., no network failures including failures in controller cluster), the primary controller, Controller A 102, controls the network 120 (i.e., every network element) by communicating information through the control channels to the network elements. The Controller A 102 may store status information in a status database (SDB) 104. Similarly, Controller B may store status information in a SDB 108. As an example, in an embodiment, when the Controller A 102 sends instructions to one or more of the network elements through the control channels, the Controller A 102 stores the status about the instructions in its SDB 104. The Controller A 102 then synchronizes the status information in SDB 104 with the secondary controller, Controller B 106, by a connection 112 between the primary Controller A 102 and secondary Controller B 106. The secondary Controller B 106 can update its SDB 108 with the received status information, but does not send any instructions to the network elements when it is not the primary controller.

Currently, when the connection 112 between Controller A 102 and Controller B 106 fails, Controller B 106 is not able to determine whether the primary Controller A 102 is really dead (i.e., not functioning) or if it is just the connection 112 between Controller A 102 and Controller B 106 that has failed. When the secondary Controller B 106 suspects that the primary Controller A 102 has failed, the secondary Controller B 106 promotes itself to be the new primary controller and controls the network 120. Controller B 106 acting as the primary controller starts to send instructions to the network elements through the control channels between it and the network elements. Controller B 106 stores the status about the instructions into its SDN 108. However, when Controller A 102 has not failed (i.e., only the connection between Controller A 102 and Controller B 106 has failed), the network 120 may experience issues due to both Controller A 102 and Controller B 106 acting as the primary controller and sending instructions to control the network 120.

Figure 2:
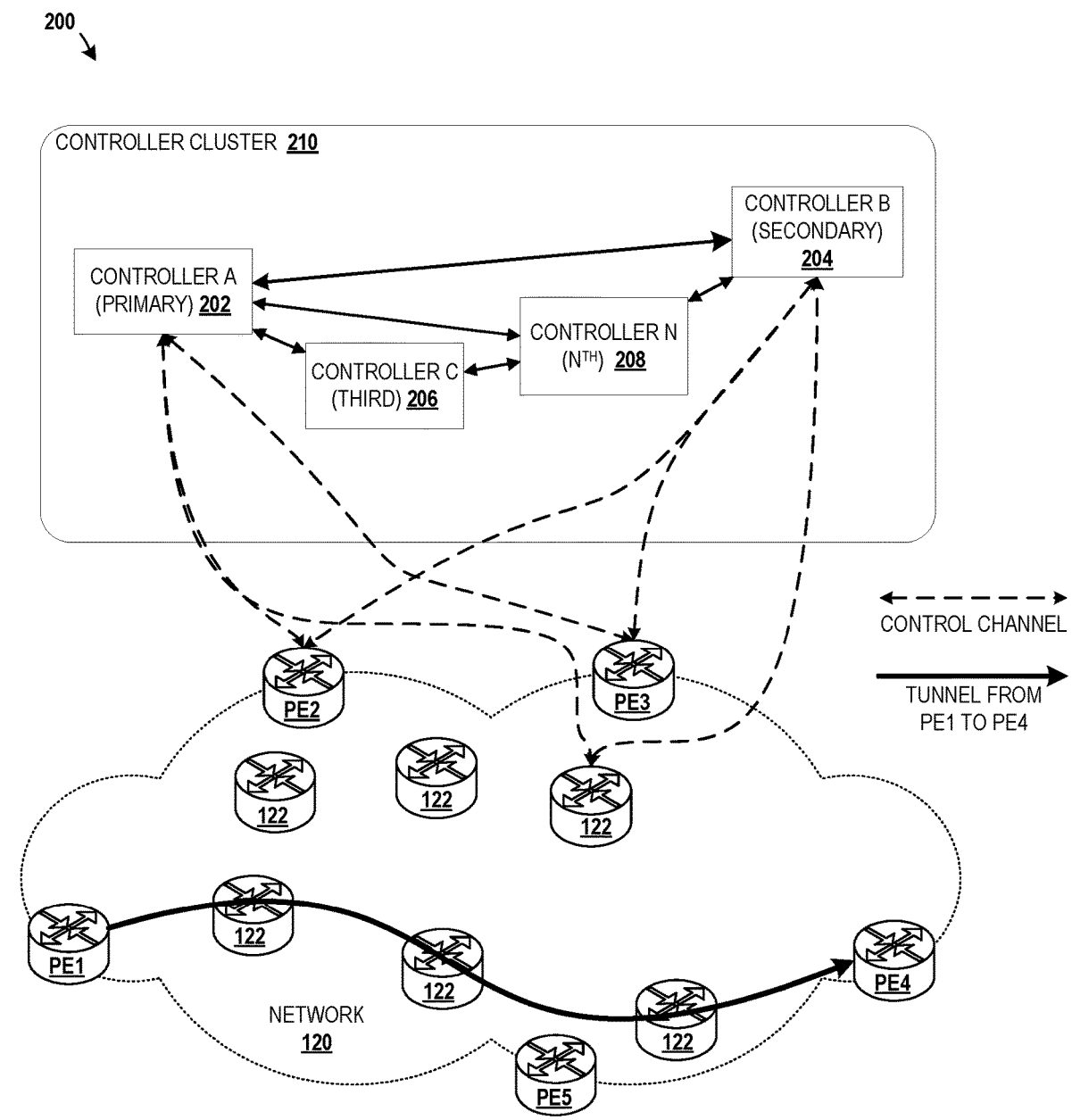
FIG. 2 is a schematic drawing illustrating a software-defined network controlled by a controller cluster that includes more than two network controllers in accordance with an embodiment of the present disclosure.

FIG. 2 is a schematic diagram illustrating a SDN 200 in accordance with an embodiment of the present disclosure. The SDN 200 is similar to the SDN 100 in FIG. 1, except that the network 120 is controlled by a controller cluster 210 that includes more than two controllers. For example, the controller cluster 210 can include a primary Controller A 202, a secondary Controller B 204, a third controller C 206, and an Nth Controller N 208. Each of the controllers in the controller cluster 210 have a direct or indirect connection or communication link with one or more of the other controllers in the controller cluster 210 for exchanging status information or other data (e.g., for synchronizing its states in its SDB (not shown) with the other controllers by the connections). During normal operation, the primary Controller A 202 send instructions to the network elements through the control channels between the primary Controller A 202 and the network elements, and the other controllers do not send any instructions to the network elements.

Similar to the SDN 100 in FIG. 1, when the primary Controller A 202 fails, the secondary Controller B 204 promotes itself to be the new primary controller and controls the network 120. The secondary Controller B 204 starts to send instructions to the related network elements through the control channels between the secondary Controller B 204 and the network elements. The secondary Controller B 204 stores the status about the instructions into its SDB. The secondary Controller B 204 synchronizes the states in its SDB with the other controllers, which promote themselves up by one position (e.g., third controller becomes secondary controller) when the primary Controller A 202 fails.

In contrast to the SDN 100 in FIG. 1, when multiple failures occur in the controller cluster 210 at the same time, or exist at the same time, the controller cluster 210 may be split into a few separated groups of controllers. For example, when the link between Controller A 202 and Controller B 204, the link between Controller A 202 and Controller N 208, and Controller C 206 all concurrently fail, the controller cluster 210 would split into at least two groups, group 1 comprising Controller A 202, and group 2 comprising Controller B 204 and Controller N 208. In an embodiment, the group with the maximum number of controllers (in this case group 2 with Controller B 204 and Controller N 208) is responsible for controlling the network as the primary group of the controllers for the controller cluster 210. The controllers in the primary group will assign a new primary controller, secondary controller, and so on for the network 120 based on the positions of the controllers in the primary group (e.g., Controller B becomes the new primary controller and Controller N 208 becomes controller N−1). However, as it currently stands, a separated group of controllers cannot determine whether it has the maximum number of controllers because it does not have any information about the other separated groups. Thus, more than one group of controllers may end up assigning a new primary controller for the network 120, each instructing the network elements and thereby, creating network reliability issues.

Figure 3:
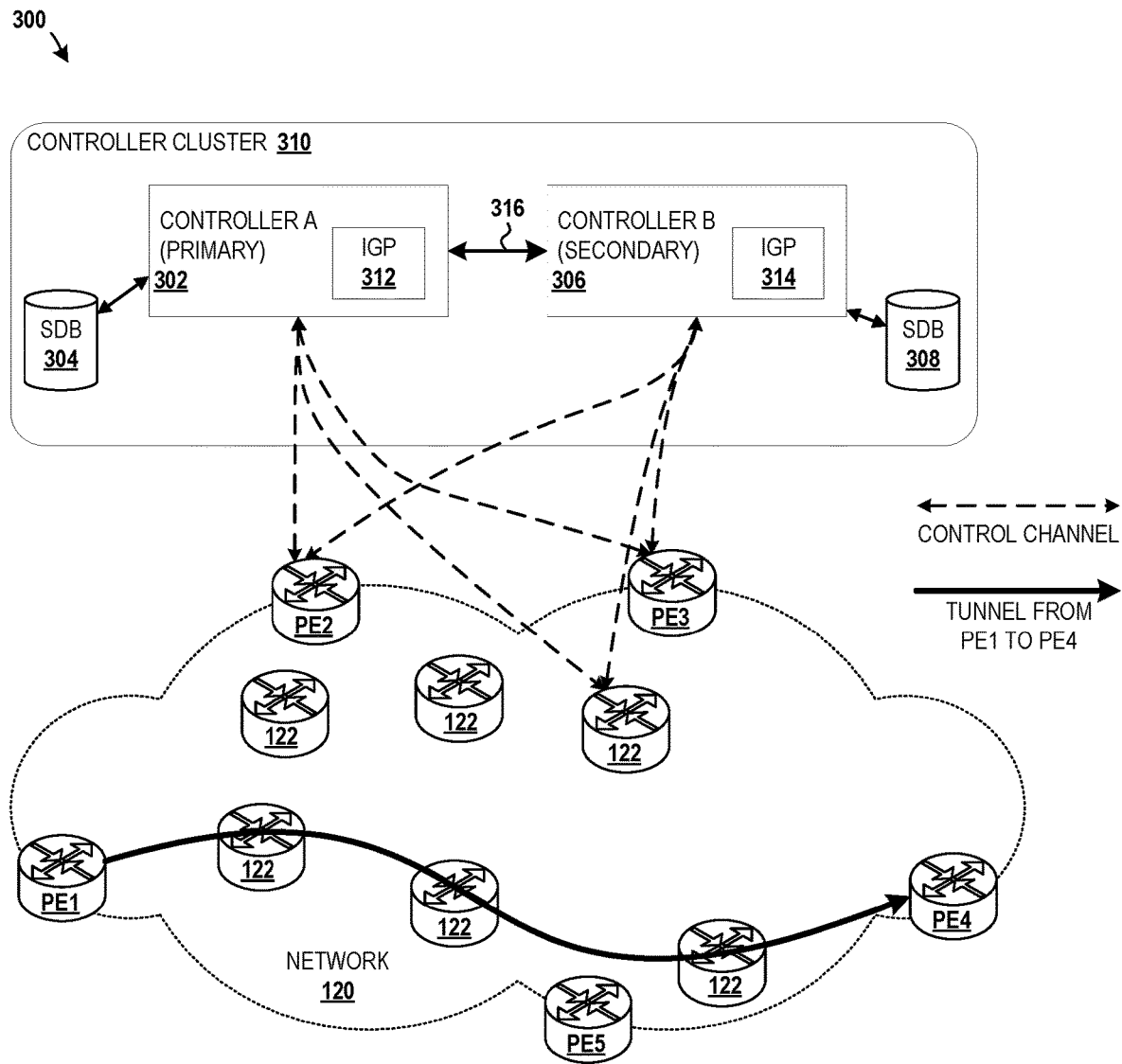
FIG. 3 is a schematic diagram illustrating a software-defined network controlled by a controller cluster that includes two network controllers and implements Interior Gateway Protocol (IGP) with extensions for providing network reliability in accordance with an embodiment of the present disclosure.

FIG. 3 is a schematic diagram illustrating a SDN 300 in accordance with an embodiment of the present disclosure. The SDN 300 is similar to the SDN 100 in FIG. 1. As stated above, Controller B 306 cannot currently determine whether the primary Controller A 302 has failed or if it is just the connection 316 between Controller A 302 and Controller B 306 that has failed. This can result in both the Controller B 306 becoming the primary controller while Controller A 302 is also the primary controller. To address this issue, each controller, Controller A 302 and Controller B 306, uses an IGP (OSPF or IS-IS) as an information proxy (referred to herein as IGP information proxy or IGP proxy for short). For example, the Controller A 302 includes an IGP proxy 312, and the Controller B 306 includes an IGP proxy 314. The IGP proxy 312 is a module (software, hardware, or a combination thereof) configured to use IGP with the new extensions as disclosed herein (e.g., a controller TLV for OSPF disclosed in FIG. 5 or a controller TLV for IS-IS disclosed in FIG. 9) to communicate information about the controller directly or indirectly to network elements and other controllers. In an embodiment, each IGP proxy in a controller establishes an IGP adjacency relation or relationship with one or more network elements in the network 120. An adjacency relation or relationship is a virtual link or connection between two nodes that is maintained in a link state database on the nodes. Adjacencies are formed for the purpose of exchanging routing information. In some embodiments, each IGP proxy in a controller establishes an IGP adjacency relationship with all of the network elements in the network 120. In an embodiment, the IGP proxy establishes and maintains the adjacency relationship over the control channel between the controller and the network elements. In other embodiments, the IGP proxy establishes and maintains the adjacency relationship over a connection other than the control channel between the controller and the network elements such as, but not limited to, a link between the controller and the network elements. In an embodiment, when one adjacency relation is broken, a new adjacency relation is created and maintained when possible. The given number of adjacency relations is retained (i.e., not changed) by the IGP proxy.

In an embodiment, each IGP proxy of a controller in the controller cluster 310 communicates information about the controller to the network elements using new IGP with extensions. In an embodiment, the information about the controller is included in a new controllers TLV. In an embodiment, the controllers TLV is included in a RI LSA or in a LSP advertised by the controller. Each IGP proxy of the controllers in the controller cluster 310 can maintain a link state database (LSDB) that can be used to determine whether the other controller is still connected to one or more network elements. For example, the IGP proxy 314 of the Controller B 306 can check its LSDB to determine whether the primary Controller A 302 is still connected to one or more network elements of the network 120. When the primary Controller A 302 is not connected to one or more network elements, then it indicates that the primary Controller A 302 has failed. The Controller B 306 can then safely become the primary controller in the controller cluster 310 without creating any network issues from having two primary controllers.

Figure 4:
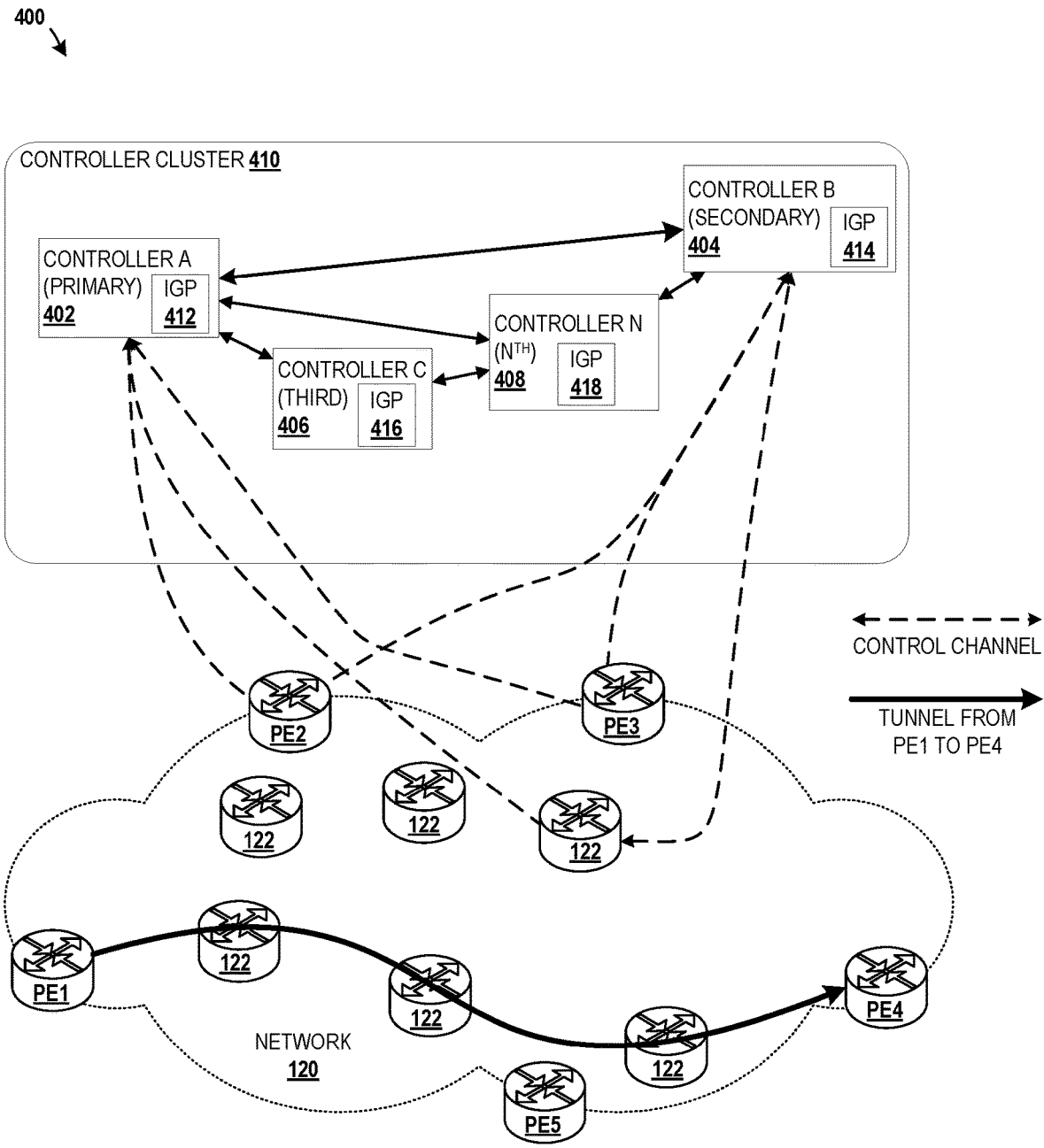
FIG. 4 is a schematic drawing illustrating a software-defined network controlled by a controller cluster that includes more than two network controllers and implements IGP with extensions for providing network reliability in accordance with an embodiment of the present disclosure.

FIG. 4 is a schematic diagram illustrating a SDN 400 in accordance with an embodiment of the present disclosure. The SDN 400 is similar to the SDN 200 in FIG. 2, except that each controller in the controller cluster 410 includes an IGP proxy as disclosed herein. For example, primary Controller A 402 includes IGP proxy 412, secondary Controller B 404 includes IGP proxy 414, third controller C 406 includes IGP proxy 416, and Nth Controller N 408 includes IGP proxy 418. In an embodiment, each IGP proxy of a controller in the controller cluster 410 establishes and maintains an IGP adjacency relation with each of the network elements in the network 120. In an embodiment, the IGP proxy adjacency relation is established and maintained over a control channel between the controller and the network elements. In another embodiment, the IGP proxy adjacency relation is established and maintained over a connection other than the control channel between the controller and the network elements such as, but not limited to, a link between the controller and the network elements. In an embodiment, when one adjacency relation is broken between an IGP proxy and a network element, the IGP proxy creates and maintains, when possible, a new adjacency relation with the network element. In an embodiment, the given number of adjacency relations is retained. The network elements provide an indirect connection between the controllers in the controller cluster 410 for the exchanging of controller and/or controller group information using new IGP with extensions.

Figure 5:
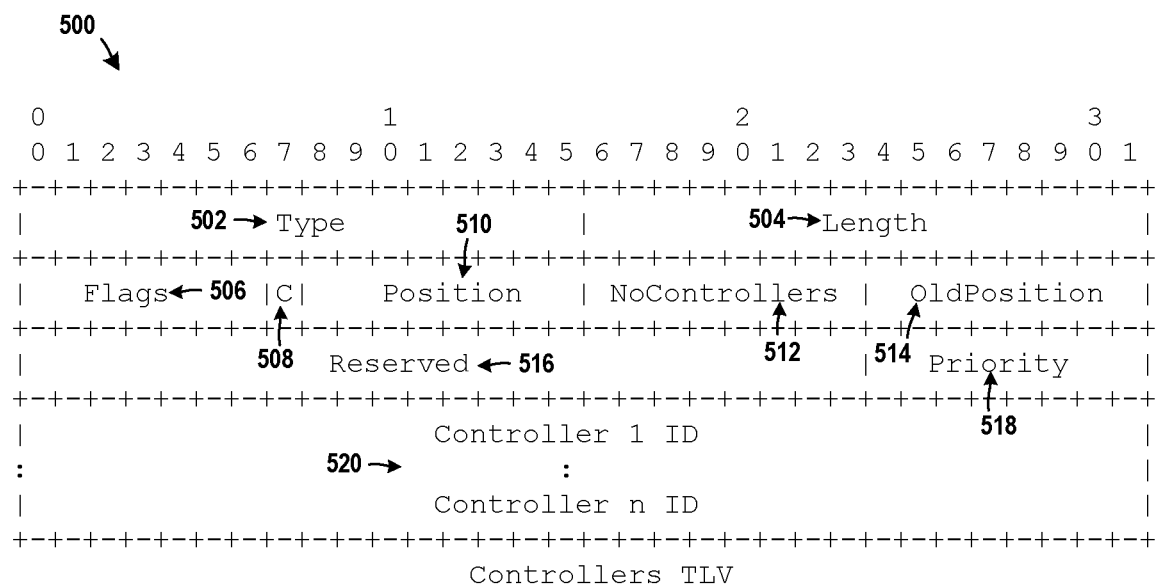
FIG. 5 is a Controllers Type/Length/Value (TLV) in accordance with an embodiment of the present disclosure.

FIG. 5 is a Controllers TLV 500 in accordance with an embodiment of the present disclosure. In an embodiment, the Controllers TLV 500 is a protocol extension to Open Shortest Path First (OSPF). In an embodiment, when OSPF acts as a proxy of a controller in a cluster, the IGP proxy advertises the information about the controller such as the number of controllers connected to the advertising controller (including itself) in its RI LSA (e.g., as described in FIG. 7 and FIG. 8) using the Controllers TLV 500.

In the depicted embodiment, the Controllers TLV 500 includes a Type field 502, a Length field 504, a Flags field 506, a C-bit field 508, a Position field 510, a NoControllers field 512, a OldPosition field 514, a Reserved field 516, a Priority field 518, and Controller ID field 520. The Type field 502 is 16 bits for specifying a type value that indicates that the data format is a Controllers TLV 500. The value of the Type field 502 is to be assigned by the Internet Assigned Numbers Authority (IANA). The Length field 504 is also 16 bits. The Length field 504 indicates the length of the value or payload portion of the Controllers TLV 500 in octets (i.e., the size of the Controllers TLV 500 excluding the Type field 502 and Length field 504). The Flags field 506 is 8 bits and includes the C-bit field 508. The Flags field 506 can be used to indicate one or more flags (to be determined). The C-bit field 508 is set to a first value (e.g., 1) to indicate that the advertising controller (i.e., the controller advertising the link state information) is the current active primary controller. The Position field 510 is 8 bits. The Position field 510 indicates the current or intended relative position of the controller within the controller cluster or group relative to other controllers within that controller cluster or group. For instance, a position value of 1 in the Position Field 510 indicates that the controller is a primary (first) controller in the controller cluster relative to the other controllers in the controller cluster, a position value of 2 indicates that the controller is a secondary controller relative to the other controllers in the controller cluster, and so on (i.e., Controller Position of value n indicates nth controller in the cluster or group). For example, when the C-bit field 508 is set to 1 (C=1) and the position in the Position Field 510 is set to 1 (Position=1), the controller is the current active primary controller controlling the network. The NoControllers field 512 is 8 bits. The NoControllers field 512 indicates the number of controllers connected to the controller that advertised the Controllers TLV 500. The OldPosition field 514 is 8 bits. The OldPosition field 514 indicates the old position of the controller in the controller cluster prior to the controller cluster being split. The Reserved field 516 is 24 bits and is reserved for future use. In an embodiment, the Reserved field 516 is set to zero for transmission and ignored for reception. The Priority field 518 is 8 bits. The Priority field 518 indicates the priority of the controller relative to other controllers in the cluster or group, which determines which controller will be promoted to the active primary controller upon a failure of the current active primary controller. The value of the Priority field 518 can be configured by a network engineer or systems administrator. In an embodiment, a controller with the priority of zero cannot be selected as a primary controller, and a controller with the priority of the highest value in a cluster or group is selected as a primary controller. The Controller ID field 520 is multiple 32 bits. The Controller ID field 520 contains the identifier (ID) of controller i at position i (i=1, n) in the cluster or group and each ID is 32 bits.

Figure 6A:
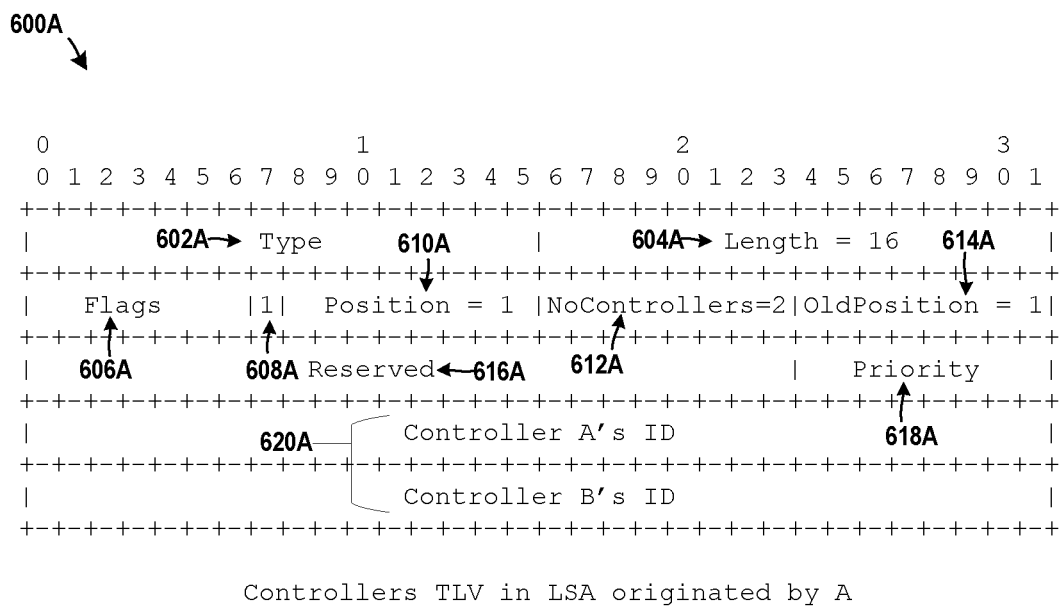
FIG. 6A is an example of a Controllers TLV in accordance with an embodiment of the present disclosure.

FIG. 6A is an example of a Controllers TLV 600A in accordance with an embodiment of the present disclosure. The Controllers TLV 600A depicts an example of the Controllers TLV 500 for a controller cluster having two controllers such as depicted in FIG. 3. Specifically, the Controllers TLV 600A depicts the controller information of the primary controller (e.g., Controller A 302 in FIG. 3) in a controller cluster having two controllers during normal operations. As stated above, the Controllers TLV 600A when included in a RI LSA (e.g., as described in FIG. 7 and FIG. 8) advertises the information about the controller such as the number of controllers connected to the advertising controller (including itself).

In the depicted embodiment, the Controllers TLV 600A includes a Type field 602A, a Length field 604A, a Flags field 606A, a C-bit field 608A, a Position field 610A, a NoControllers field 612A, a OldPosition field 614A, a Reserved field 616A, a Priority field 618A, and Controller ID field 620A. As stated above, the Type field 602A is 16 bits and stores a value (to be determined) that indicates that the data format is a Controllers TLV. The Length field 604A is 16 to indicate the length of the value portion of the Controllers TLV 600A in octets. The Flags field 606A is 8 bits and includes the C-bit field 608A. In the depicted embodiment, the C-bit field 608A is set to 1 to indicate that the advertising controller (i.e., the controller advertising the link state information) is the current active primary controller. The Position field 610A is set to 1 to indicate that the controller advertising the LSA (i.e., Controller A 302 in FIG. 3) is currently in the first position in the controller cluster or group. In the depicted embodiment, the NoControllers field 612A is set to 2 to indicate that there are only two controllers (including itself) connected to the controller advertising the Controllers TLV 600A. The OldPosition field 614A is set to 1 to indicate the old position of the controller in the controller cluster prior to the controller cluster being split (e.g., when the connection 316 between Controller A 302 and Controller B 306 in FIG. 3 fails). In an embodiment, the Reserved field 616A is set to zero for transmission and ignored for reception. The Priority field 618A indicates the priority of the controller to be elected as a primary controller. The Controller ID field 620A contains the controller IDs of the two controllers in the controller cluster or group (i.e., Controller A's ID and Controller B's ID).

Figure 6B:
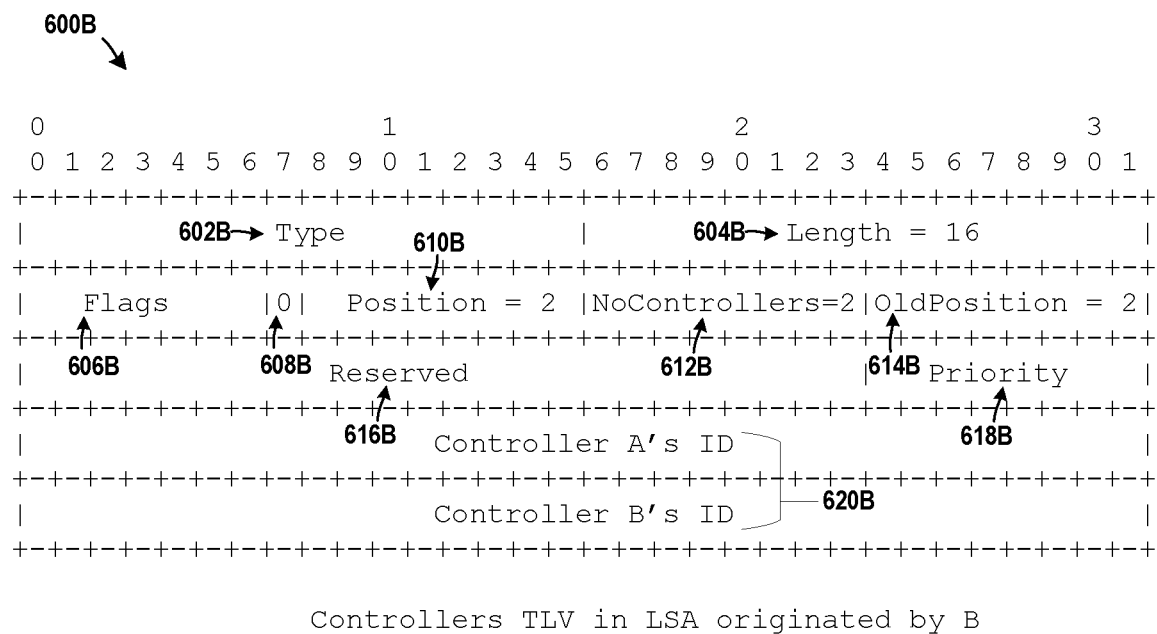
FIG. 6B is an example of a Controllers TLV in accordance with an embodiment of the present disclosure.

FIG. 6B is an example of a Controllers TLV 600B in accordance with an embodiment of the present disclosure. The Controllers TLV 600B depicts the controller information of the secondary controller (e.g., Controller B 306 in FIG. 3) in a controller cluster having two controllers during normal operations. The Controllers TLV 600B when included in a RI LSA (e.g., as described in FIG. 7 and FIG. 8) advertises the information about the controller such as the number of controllers connected to the advertising controller (including itself).

In the depicted embodiment, the Controllers TLV 600B includes a Type field 602B, a Length field 604B, a Flags field 606B, a C-bit field 608B, a Position field 610B, a NoControllers field 612B, a OldPosition field 614B, a Reserved field 616B, a Priority field 618B, and Controller ID field 620B. As stated above, the Type field 602B is 16 bits and stores a value (TBD) that indicates that the data format is a Controllers TLV. The Length field 604B is 16 to indicate the length of the value portion of the Controllers TLV 600B in octets. The Flags field 606B is 8 bits and includes the C-bit field 608B. In the depicted embodiment, the C-bit field 608B is set to 0 to indicate that the advertising controller is not the current active primary controller. The Position field 610B is set to 2 to indicate that the controller advertising the LSA (i.e., Controller B 306 in FIG. 3) is currently in the second position in the controller cluster or group. The NoControllers field 612B is set to 2 to indicate that there are only two controllers (including itself) connected to the controller advertising the Controllers TLV 600B. The OldPosition field 614B is set to 2 to indicate the old position of the controller in the controller cluster prior to the controller cluster being split (e.g., when the connection 316 between Controller A 302 and Controller B 306 in FIG. 3 fails). In an embodiment, the Reserved field 616B is set to zero for transmission and ignored for reception. The Priority field 618B indicates the priority of the controller to be elected as a primary controller. The Controller ID field 620B contains the controller IDs of the two controllers in the controller cluster or group (i.e., Controller A's ID and Controller B's ID).

Figure 7:
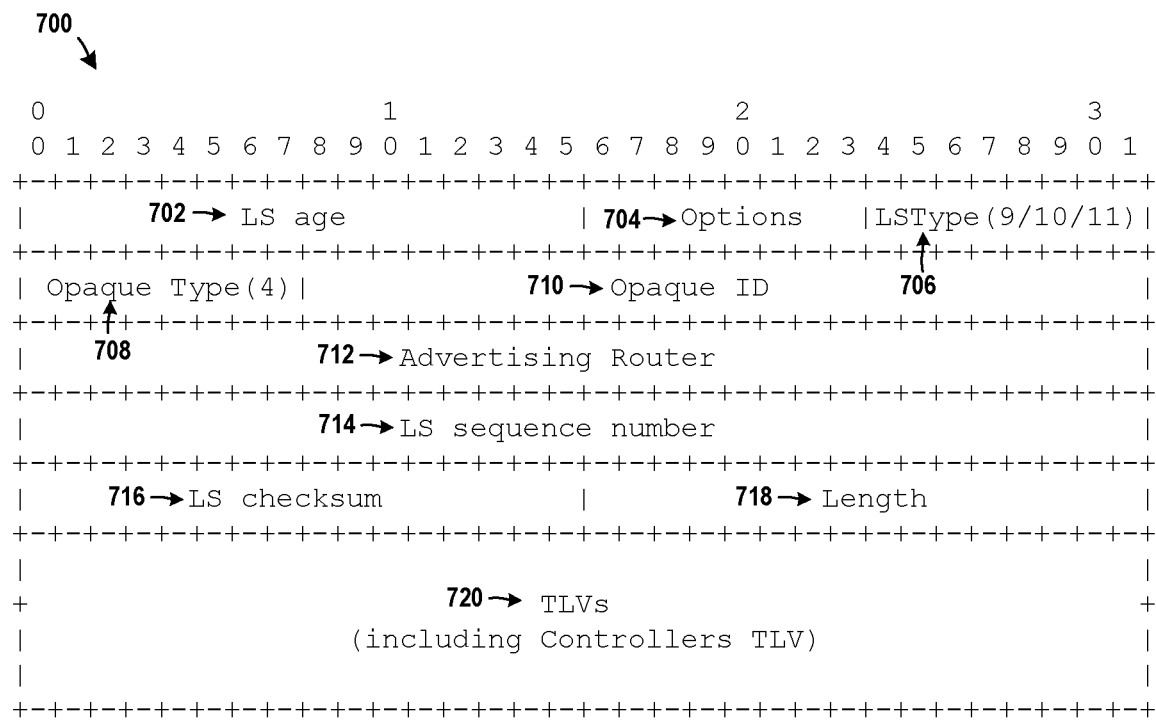
FIG. 7 is an Open Shortest Path First Version 2 (OSPFv2) Router Informational (RI) Opaque link-state advertisement (LSA) in accordance with an embodiment of the present disclosure.

FIG. 7 is an OSPFv2 RI Opaque LSA 700 in accordance with an embodiment of the present disclosure. In an embodiment, when information about a controller changes (e.g., link state information, router capabilities, or when an OSPF router instance is created), the IGP proxy of a controller (e.g., Controller A 302 and/or Controller B 306 in FIG. 3) originates the OSPFv2 Router Information Opaque LSA 700 to advertise the new information to the network elements.

In an embodiment, the OSPFv2 Router Information Opaque LSA 700 includes the standard fields of an OSPFv2 Router Information Opaque LSA, which includes a Link State (LS) age field 702, an Options field 704, a LS Type field 706, an Opaque Type field 708, an Opaque identifier (ID) field 710, an Advertising Router field 712, an LS sequence number field 714, a LS checksum field 716, a Length field 718, and TLVs field 720. The LS age field 702 contains the age of the OSPFv2 Router Information Opaque LSA 700 advertisement in seconds to enable old advertisements to be flushed from the routing domain. The Options field 704 specifies one or more OSPFv2 options. The Options field 704 enables OSPF routers to support (or not support) optional capabilities, and to communicate their capability level to other OSPF routers. The LS Type field 706 is used to indicate the flooding scope of the OSPFv2 Router Information Opaque LSA 700. For OSPFv2, type 9 (link-scoped), type 10 (area-scoped), or a type 11 (AS-scoped) opaque LSA may be flooded. The Opaque Type field 708 is type 4 and the Opaque ID field 710 is a value that is used to identify an instance of a OSPFv2 Router Information (RI) opaque LSA. The Advertising Router field 712 contains the router ID of the router that originated the OSPFv2 Router Information Opaque LSA 700. The LS sequence number field 714 contains successive sequence numbers used to detect old or duplicate LSAs. The LS checksum field 716 contains a checksum of the complete contents of the OSPFv2 Router Information Opaque LSA 700, excluding the LS age field 702. The Length field 718 represents the total length (in octets) of the OSPFv2 Router Information Opaque LSA 700. The TLVs field 720 contains one or more TLVs including one or more controller TLVs such as Controllers TLV 500 in FIG. 5. As stated above, the Controllers TLVs, using IGP for transport, enable a controller in a control cluster to share information about the controller with other controllers connected to the controller. The information may include, for example, the number of controllers connected to the advertising controller.

Figure 8:
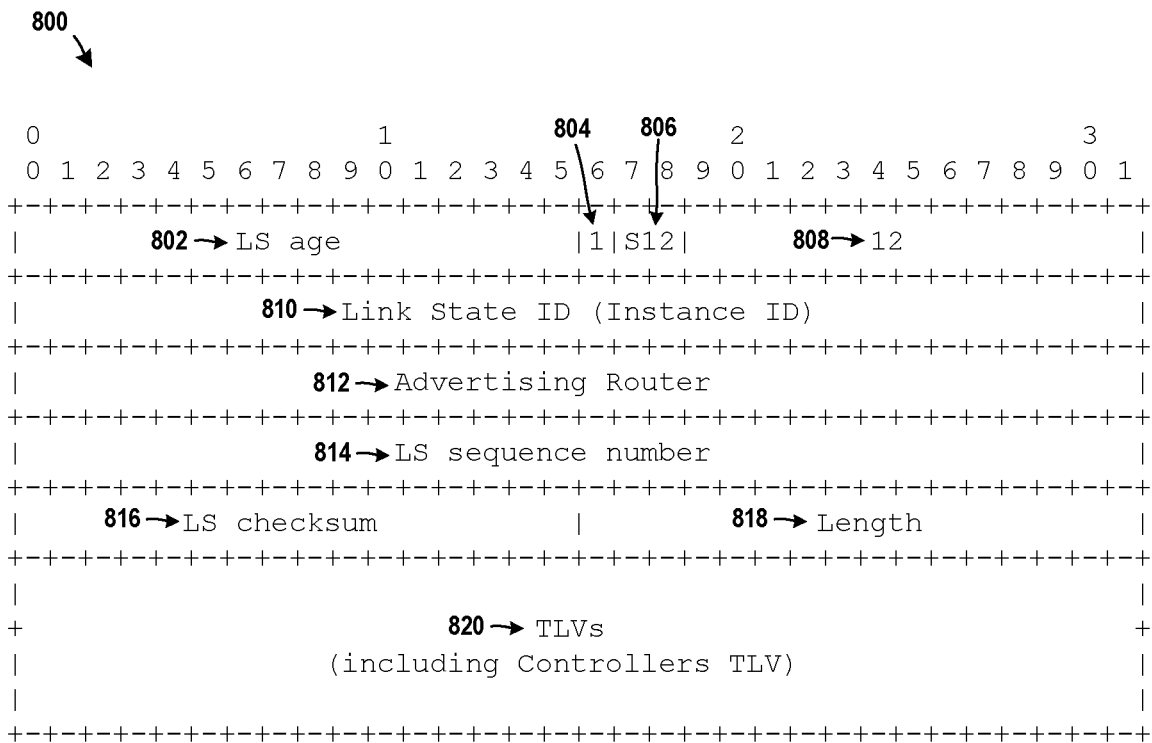
FIG. 8 is an Open Shortest Path First Version 3 (OSPFv3) RI Opaque LSA in accordance with an embodiment of the present disclosure.

FIG. 8 is an OSPFv3 RI Opaque LSA 800 in accordance with an embodiment of the present disclosure. Similar to the OSPFv2 RI Opaque LSA 700 of FIG. 7, when information about a controller changes (e.g., link state information, router capabilities, or when an OSPF router instance is created), the IGP proxy of a controller originates the OSPFv3 Router Information Opaque LSA 800 to advertise the new information to the network elements.

In the depicted embodiment, the OSPFv3 Router Information Opaque LSA 800 includes a Link State (LS) age field 802, a U bit field 804, a S1/S2 field 806, a function field 808, a Link State ID (Instance ID) field 810, an Advertising Router field 812, an LS sequence number field 814, a LS checksum field 816, a Length field 818, and TLVs field 820. The LS age field 802 contains the age of the OSPFv3 Router Information Opaque LSA 800 advertisement in seconds to enable old advertisements to be flushed from the routing domain. The U bit field 804 is used to indicate how a router should handle unknown LSA. In the depicted embodiment, the U bit field 804 has a value of 1 to indicate that the OSPFv3 Router Information Opaque LSA 800 should be flooded even when the OSPFv3 Router Information Opaque LSA 800 is not understood by the router (i.e., stored and flooded as if the OSPFv3 Router Information Opaque LSA 800 was understood). When the U bit is cleared or set to 0, the unknown LSA is to be treated as if the OSPFv3 Router Information Opaque LSA 800 had link-local flooding scope. The S1/S2 field 806 indicates the desired flooding scope for the OSPFv3 Router Information Opaque LSA 800. For example, when both S1 and S2 are 0, the flooding scope is link-local; when S1 is 1 and S2 is 0, the flooding scope is area flooding; and when S1 is 0 and S2 is 1, the flooding scope is Autonomous System/Routing Domain. The function field 808 indicates the LSA type. In the depicted embodiment, a value of 12 as assigned by IANA indicates that the LSA is an OSPFv3 RI LSA. The Link State ID field 810 indicates the Instance ID. The Instance ID enables multiple instances of OSPFv3 RI LSAs. The Advertising Router field 812 contains the router ID of the router that originated the OSPFv3 Router Information Opaque LSA 800. The LS sequence number field 814 contains successive sequence numbers used to detect old or duplicate LSAs. The LS checksum field 816 contains a checksum of the complete contents of the OSPFv3 Router Information Opaque LSA 800, excluding the LS age field 802. The Length field 818 represents the total length (in octets) of the OSPFv3 Router Information Opaque LSA 800. The TLVs field 820 contains one or more TLVs including one or more controller TLVs such as Controllers TLV 500 in FIG. 5.

Figure 9:
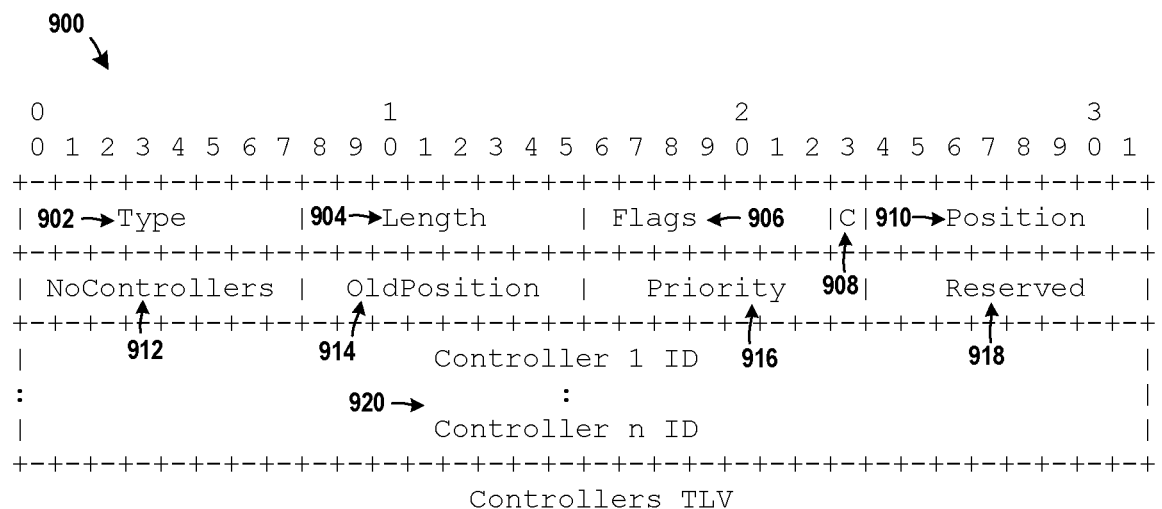
FIG. 9 is a Controllers TLV in accordance with an embodiment of the present disclosure.

FIG. 9 is a Controllers TLV 900 in accordance with an embodiment of the present disclosure. In an embodiment, the Controllers TLV 900 is a protocol extension to IS-IS. In an embodiment, when IS-IS acts as a proxy of a controller in a cluster, the IGP proxy advertises, in an LSP using the Controllers TLV 900, the information about the controller such as the number of controllers connected to the controller (including itself).

In the depicted embodiment, the Controllers TLV 900 includes a Type field 902, a Length field 904, a Flags field 906, a C-bit field 908, a Position field 910, a NoControllers field 912, a OldPosition field 914, a Priority field 916, a Reserved field 918, and Controller ID field 920. The Type field 902 is 8 bits for specifying a type value that indicates that the data format is a Controllers TLV 900. The value of the Type field 902 is to be assigned by the IANA. The Length field 904 is 8 bits. The Length field 904 indicates the length of the value portion in octets. The Flags field 906 is 8 bits and includes the C-bit field 908. The Flags field 906 can be used to indicate one or more flags (to be determined). The C-bit field 908 is set to 1 to indicate that the controller is the current active primary controller. The Position field 910 is set to 1 to indicate the current or intended relative position of the controller within the controller cluster or group (e.g., 1=primary, 2=secondary, etc.). The NoControllers field 912 indicates the number of controllers connected to the controller advertising the Controllers TLV 900. The OldPosition field 914 is 8 bits. The OldPosition field 914 indicates the old position of the controller in the controller cluster prior to the controller cluster being split. The Priority field 916 is 8 bits. The Priority field 916 indicates the priority of the controller to be elected as a primary controller. The Reserved field 918 is 8 bits and is reserved for future use. In an embodiment, the Reserved field 918 is set to zero for transmission and ignored for reception. The Controller ID field 920 is multiple 32 bits. The Controller ID field 920 contains the identifier (ID) of controller i at position i (i=1, . . . , n) in the cluster or group.

Figure 10A:
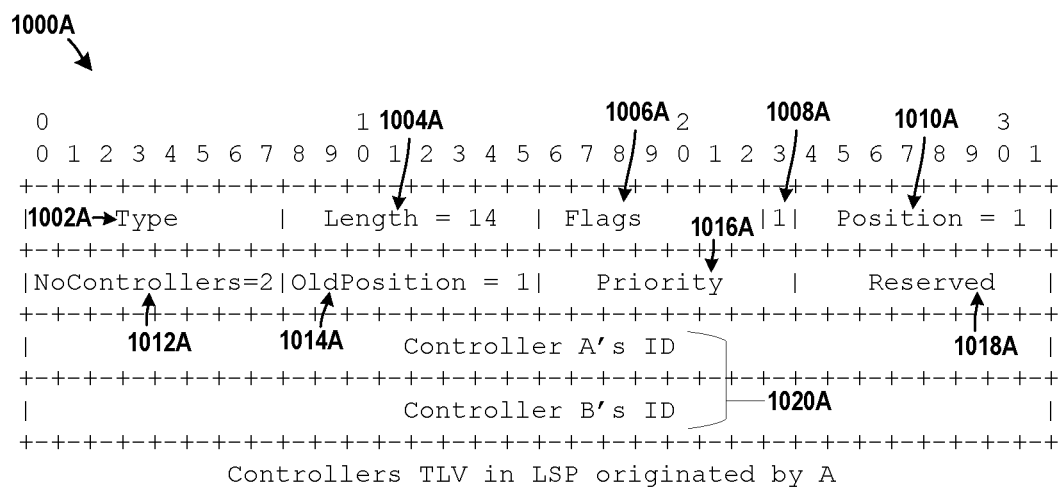
FIG. 10A is an example of a Controllers TLV in accordance with an embodiment of the present disclosure.

FIG. 10A is an example of a Controllers TLV 1000A in accordance with an embodiment of the present disclosure. The Controllers TLV 1000A depicts an example of the Controllers TLV 900 for a controller cluster having two controllers such as depicted in FIG. 9. Specifically, the Controllers TLV 1000A depicts the controller information of the primary controller (e.g., Controller A 302 in FIG. 3) in a controller cluster having two controllers during normal operations. The Controllers TLV 1000A when included in a LSP advertises the information about the controller such as the number of controllers connected to the controller (including itself).

The Controllers TLV 1000A includes a Type field 1002A, a Length field 1004A, a Flags field 1006A, a C-bit field 1008A, a Position field 1010A, a NoControllers field 1012A, a OldPosition field 1014A, a Priority field 1016A, a Reserved field 1018A, and Controller ID field 1020A. The Type field 1002A specifies a type value (TBD) that indicates the data format is a Controllers TLV. The Length field 1004A is 14 to indicate the length of the value portion in octets. The Flags field 1006A can be used to indicate one or more flags. The C-bit field 1008A is set to 1 to indicate that the advertising controller is the current active primary controller. The Position field 1010A is set to 1 to indicate the current or intended relative position of the controller within the controller cluster or group (e.g., 1=primary, 2=secondary, etc.). The NoControllers field 1012A is set to 2 to indicate the number of controllers connected to the controller that advertised the Controllers TLV 1000A (including itself). The OldPosition field 1014A is set to 1 to indicate the old position of the controller in the controller cluster prior to the controller cluster being split. The Priority field 1016A indicates the priority of the controller to be elected as a primary controller. The Reserved field 1018A is set to zero for transmission and ignored for reception. The Controller ID field 1020A contains the controller ID of the two controllers in the controller cluster or group (i.e., Controller A's ID and Controller B's ID).

Figure 10B:
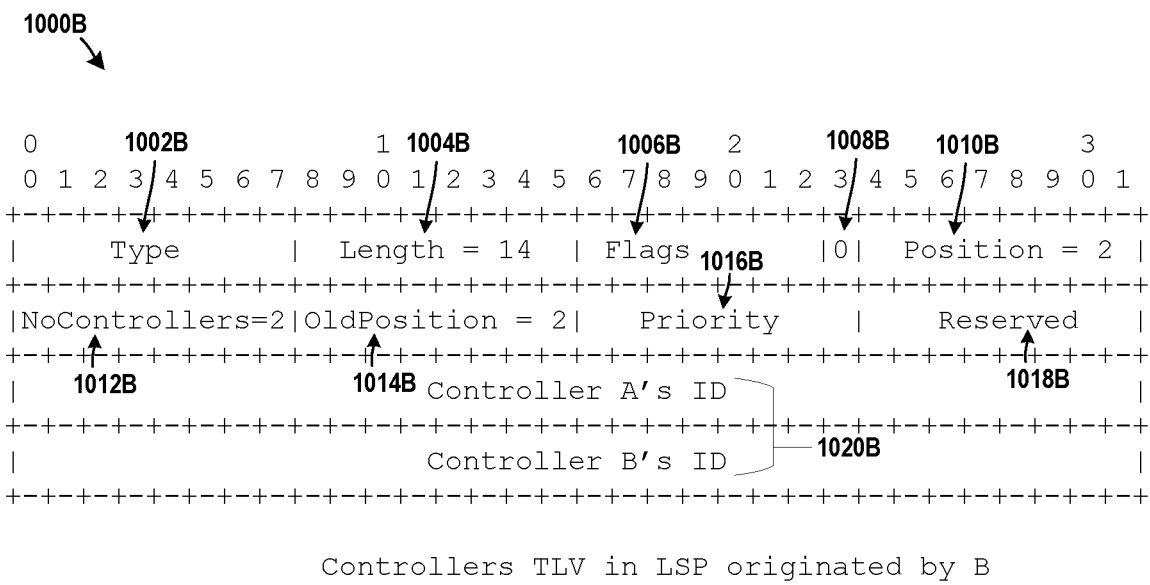
FIG. 10B is an example of a Controllers TLV in accordance with an embodiment of the present disclosure

FIG. 10B is an example of a Controllers TLV 1000B in accordance with an embodiment of the present disclosure. The Controllers TLV 1000B depicts an example of the Controllers TLV 900 for a controller cluster having two controllers such as depicted in FIG. 9. Specifically, the Controllers TLV 1000B depicts the controller information of the secondary controller (e.g., Controller B 306 in FIG. 3) in a controller cluster having two controllers during normal operations. The Controllers TLV 1000B when included in a LSP advertises the information about the controller such as the number of controllers connected to the controller (including itself).

The Controllers TLV 1000B includes a Type field 1002B, a Length field 1004B, a Flags field 1006B, a C-bit field 1008B, a Position field 1010B, a NoControllers field 1012B, a OldPosition field 1014B, a Priority field 1016B, a Reserved field 1018B, and Controller ID field 1020B. The Type field 1002B specifies a type value (TBD) that indicates the data format is a Controllers TLV. The Length field 1004B is 14 to indicate the length of the value portion in octets. The Flags field 1006B can be used to indicate one or more flags.

The C-bit field 1008B is set to 0 to indicate that the advertising controller is not the current active primary controller. The Position field 1010B is set to 2 to indicate that the controller advertising the LSA (i.e., Controller A 302 in FIG. 3) is currently in the second position in the controller cluster or group. The NoControllers field 1012B is set to 2 to indicate the number of controllers connected to the controller advertising the Controllers TLV 1000B (including itself). The OldPosition field 1014B is set to 2 to indicate the old position of the controller in the controller cluster prior to the controller cluster being split (e.g., when the connection 316 between Controller A 302 and Controller B 306 in FIG. 3 fails). The Priority field 1016B indicates the priority of the controller to be elected as a primary controller. The Reserved field 1018B is set to zero for transmission and ignored for reception. The Controller ID field 1020B contains the controller IDs of the two controllers in the controller cluster or group (i.e., Controller A's ID and Controller B's ID).

Figure 11:
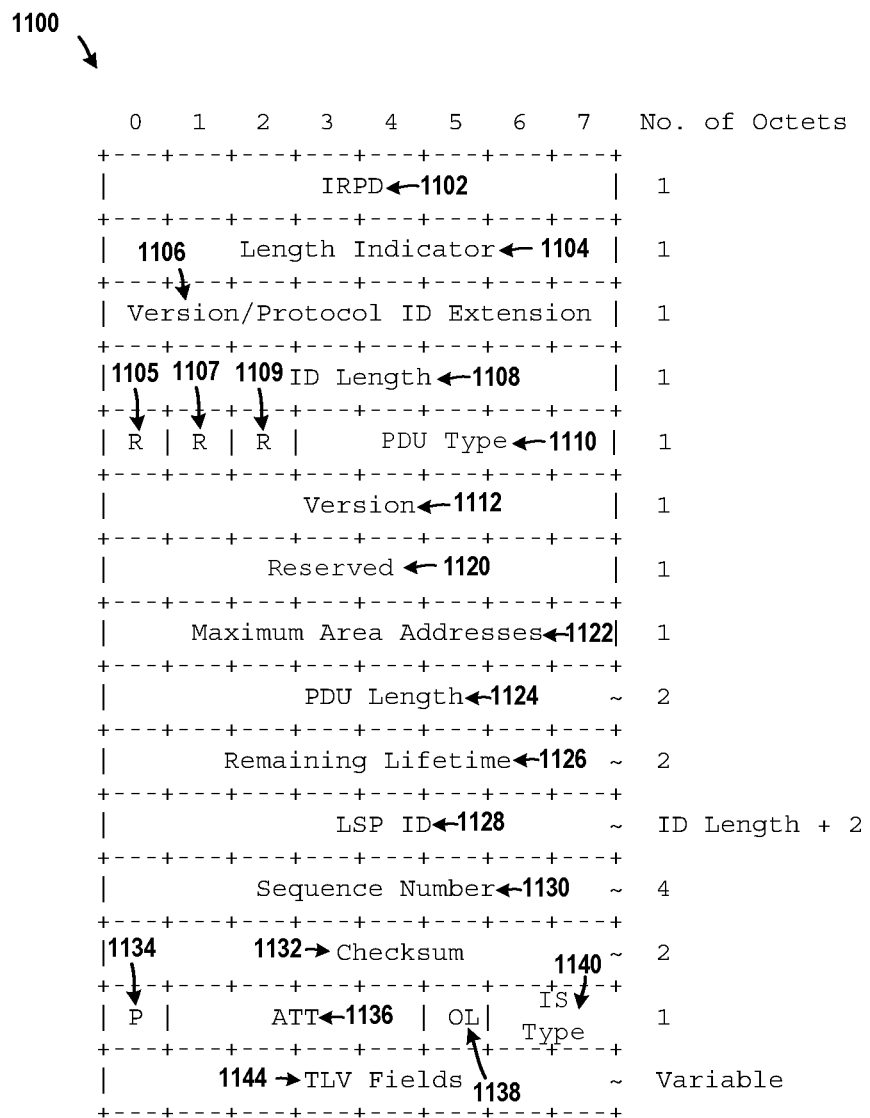
FIG. 11 is an Intermediate System to Intermediate System (IS-IS or ISIS) Link State Protocol Data Unit (LSP) according to an embodiment of the present disclosure.

FIG. 11 is a schematic diagram illustrating an IS-IS LSP 1100 according to an embodiment of the present disclosure. In an embodiment, when information about a controller changes (e.g., link state information, router capabilities, or when an IS-IS router instance is created), the IGP proxy of a controller (e.g., Controller A 302 and/or Controller B 306 in FIG. 3) originates the IS-IS LSP 1100 to advertise the new information to the network elements.

In the depicted embodiment, the IS-IS LSP 1100 includes an Intradomain Routing Protocol Discriminator (IRPD) field 1102, a Length Indicator field 1104, a Version/Protocol ID Extension field 1106, an ID Length field 1108, a protocol data unit (PDU) Type field 1110, a Version field 1112, a Reserved field 1120, a Maximum Area Addresses field 1122, a PDU Length field 1124, a Remaining Lifetime field 1126, a LSP ID field 1128, a Sequence Number field 1130, a Checksum field 1132, a Partition (P) field 1134, an Attached (ATT) field 1136, an overload (OL) field 1138, an IS type field 1140, and a Type-Length-Value (TLV) fields 1144. The IS-IS LSP 1100 includes three reserved (R) bits R bit 1105, R bit 1107, and R bit 1109.

The IRPD field 1102 contains the network-layer identifier assigned to IS-IS in ISO 9577; its binary value is 10000011 (0x83). The Length Indicator field 1104 specifies the length of the fixed header fields (i.e., length of IS-IS LSP 1100 excluding the TLV fields 1144) in octets. The Version/ Protocol ID Extension field 1106 currently has value of one (1). The ID Length field 1108 specifies the length of the system ID field. The system ID field stores the system ID of the Intermediate System (IS) that generated the LSP. The system ID field is part of the Network Entity Title (NET) address (not depicted) of a Network Service Access Point (NSAP), which identifies an instance of the IS-IS routing protocol running on an IS. The ID Length field 1108 is the same for all nodes in the domain. The PDU Type field 1110 contains the PDU Type Number indicating the type of PDU (e.g., decimal values 18 and 20 for Level 1 and Level 2 LSPs, respectively). The Version field 1112 contains the version of the PDU. The Reserved field 1120 contains reserved bits that are transmitted as zero, and ignored on receipt. The Maximum Area Addresses field 1122 indicates the number of area addresses permitted for an IS area. A routing domain may be divided into one or more subdomains. Each subdomain is referred to as an area. The PDU Length field 1124 indicates the length of the entire PDU, fixed header, and TLVs. The Remaining Lifetime field 1126 indicates the time in seconds before the IS-IS LSP 1100 expires. The LSP ID field 1128 includes of three components: system ID, pseudonode ID, and LSP fragmentation number. The Sequence Number field 1130 contains successive sequence numbers used to detect old or duplicate LSPs. The Checksum field 1132 indicates the checksum of the contents of the IS-IS LSP 1100. The P field 1134 is set to indicate that the originator of the IS-IS LSP 1100 supports partition repair. The ATT field 1136 is set to indicate that the originator is attached to another area using the referred metric indicated in the ATT field 1136. The OL field 1138 is set to indicate that the originator's LSP database is overloaded and should be circumvented in path calculations to other destinations. The IS type field 1140 indicates the IS type. For example, when only bit 1 of the IS type field 1140 is set, this indicates a Level 1 IS type. When both bits of the IS type field 1140 are set, a Level 2 IS type is indicated. The TLV fields 1144 contains one or more TLVs including one or more controller TLVs such as Controllers TLV 900 in FIG. 9. As stated above, the Controllers TLVs, using IGP for transport, enable a controller in a control cluster to share information about the controller with other controllers of a controller cluster. The information may include, for example, the number of controllers connected to the advertising controller.

Figure 12A:
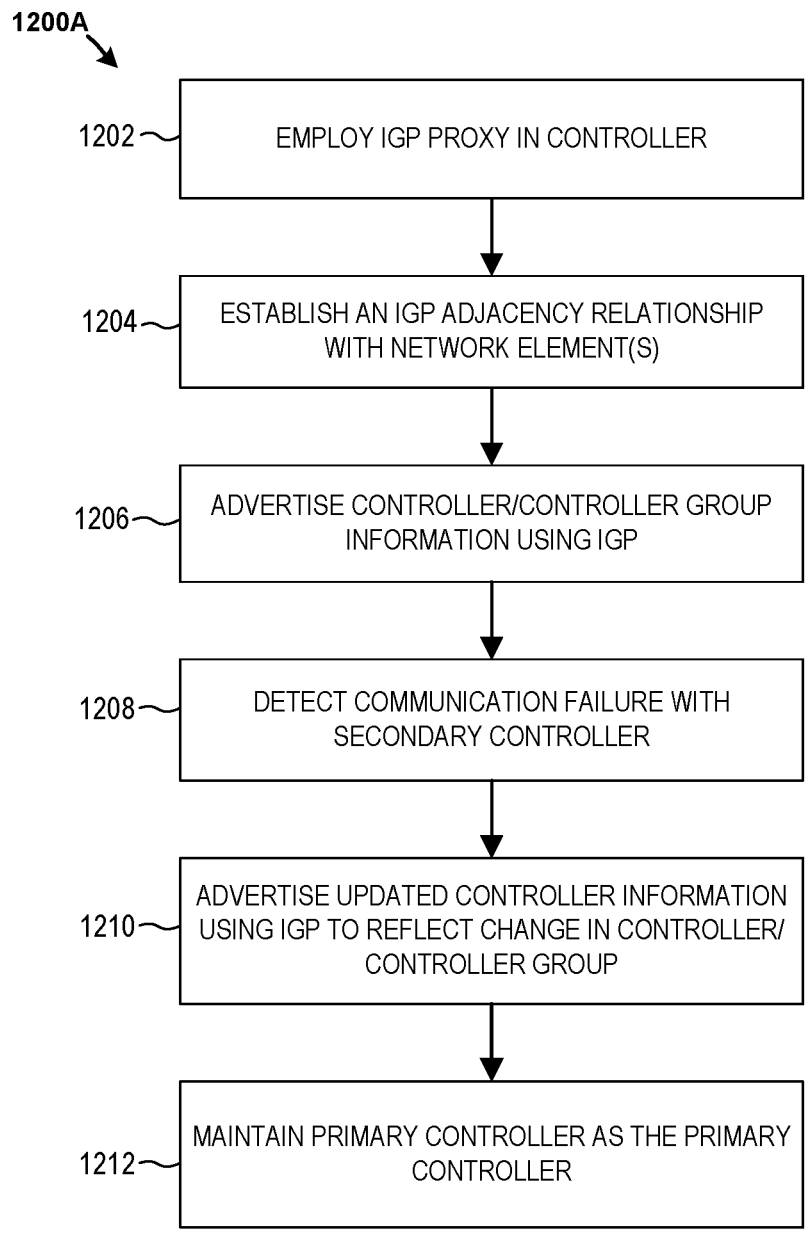
FIG. 12A is a flowchart illustrating a process performed by a primary controller for providing network reliability in accordance with an embodiment of the present disclosure.

FIG. 12A is a flowchart illustrating a process 1200A performed by a primary controller for providing network reliability in accordance with an embodiment of the present disclosure. In the depicted embodiment, the primary controller is part of a controller cluster having two controllers, the primary controller and a secondary controller, for controlling a network. The primary controller is configured to provide instructions to one or more network elements over a control channel or other channel for controlling the network such as, but not limited to, the controlling the routing of packets. The secondary controller does not provide any instructions to the network elements for controlling the network. The secondary controller is a backup controller in the event that the primary controller fails. At which point, the secondary controller will be promoted to the primary controller of the controller cluster and will control the network.

At step 1202, the primary controller employs an IGP proxy in the controller. In an embodiment, the IGP proxy is a module configured to communicate information regarding the primary controller and/or controller cluster/group to one or more network elements using IGP with extensions. At step 1204, the primary controller establishes an IGP adjacency relation or relationship with the one or more network elements for the purpose of exchanging routing information. In an embodiment, to establish the IGP adjacency relationship, the IGP proxy of the primary controller and the one or more network elements exchange a sequence of Hello packets to establish two-way communication between the IGP proxy of the controller and the one or more network elements. The IGP adjacency relationship is then formed by synchronizing their link state databases.

At step 1206, the primary controller, via the IGP proxy of the primary controller, advertises the controller information such as, but not limited to, the primary controller's position within the controller cluster and the number of controllers connected to the primary controller. For example, for OSPFv2, the primary controller advertises an OSPFv2 RI Opaque LSA 700 that includes a Controllers TLV 600A containing C-bit field 608A=1, Position field 610A=1, NoControllers field 612A=2, OldPosition field 614A=1, and Controller ID field 620A=Primary Controller's ID and Secondary Controller's ID as depicted in FIG. 6A. Similarly, for OSPFv3, the primary controller advertises an OSPFv3 RI Opaque LSA 800 that includes a Controllers TLV 600A containing C-bit field 608A=1, Position field 610A=1, NoControllers field 612A=2, OldPosition field 614A=1, and Controller ID field 620A=Primary Controller's ID and Secondary Controller's ID as depicted in FIG. 6A. For IS-IS, the primary controller advertises an LSP (e.g., IS-IS LSP 1100 in FIG. 11) that includes a Controllers TLV 1000A containing C-bit field 1008A=1, Position field 1010A=1, NoControllers field 1012A=2, OldPosition field 1014A=1, and Controller ID field 1020A=Primary Controller's ID and Secondary Controller's ID as illustrated in FIG. 10A.

At step 1208, the primary controller, via the IGP proxy of the primary controller, detects a communication failure with the secondary controller. The communication failure may be a connection failure between the primary and secondary controllers and/or a failure of the secondary controller. In an embodiment, when the primary controller detects that the heartbeat of the secondary controller has stopped, the primary controller determines that the connection with the secondary controller has failed. A heartbeat is a periodic signal generated by hardware or software of the controller to indicate normal operation to other controllers in the controller cluster.

Figure 15:
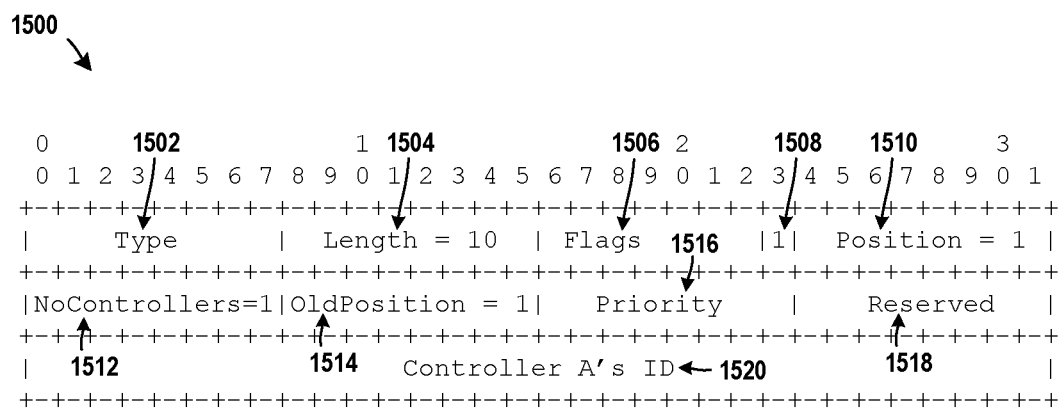
FIG. 15 is an example of a Controllers TLV in accordance with an embodiment of the present disclosure.

At step 1210, the primary controller, via the IGP proxy of the controller, advertises updated controller information using IGP with the new controllers TLV extensions to reflect the change in the controller/controller group caused by the communication failure. For example, in an embodiment, for OSPF, when the secondary controller or the link to the secondary controller fails, the primary controller advertises an LSA (e.g., OSPFv2 RI Opaque LSA 700 in FIG. 7 or OSPFv3 RI Opaque LSA 800 in FIG. 8) that includes a TLV 1300 containing C-bit field 1308=1, Position field 1313=1, NoControllers field 1312=1, OldPosition field 1314=1, and Controller ID field 1320=Primary Controller's ID as depicted in FIG. 13. Similarly, in an embodiment, for IS-IS, when the secondary controller or the link to the secondary controller fails, the primary controller advertises an LSP (e.g., LSP 1100 in FIG. 11) that includes a TLV 1500 containing C-bit field 1508=1, Position field 1515=1, NoControllers field 1512=1, OldPosition field 1514=1, and Controller ID field 1520=Primary Controller's ID as depicted in FIG. 15.

At step 1212, the primary controller maintains (or makes a determination to maintain) its status/position as the primary controller of the network.

Figure 12B:
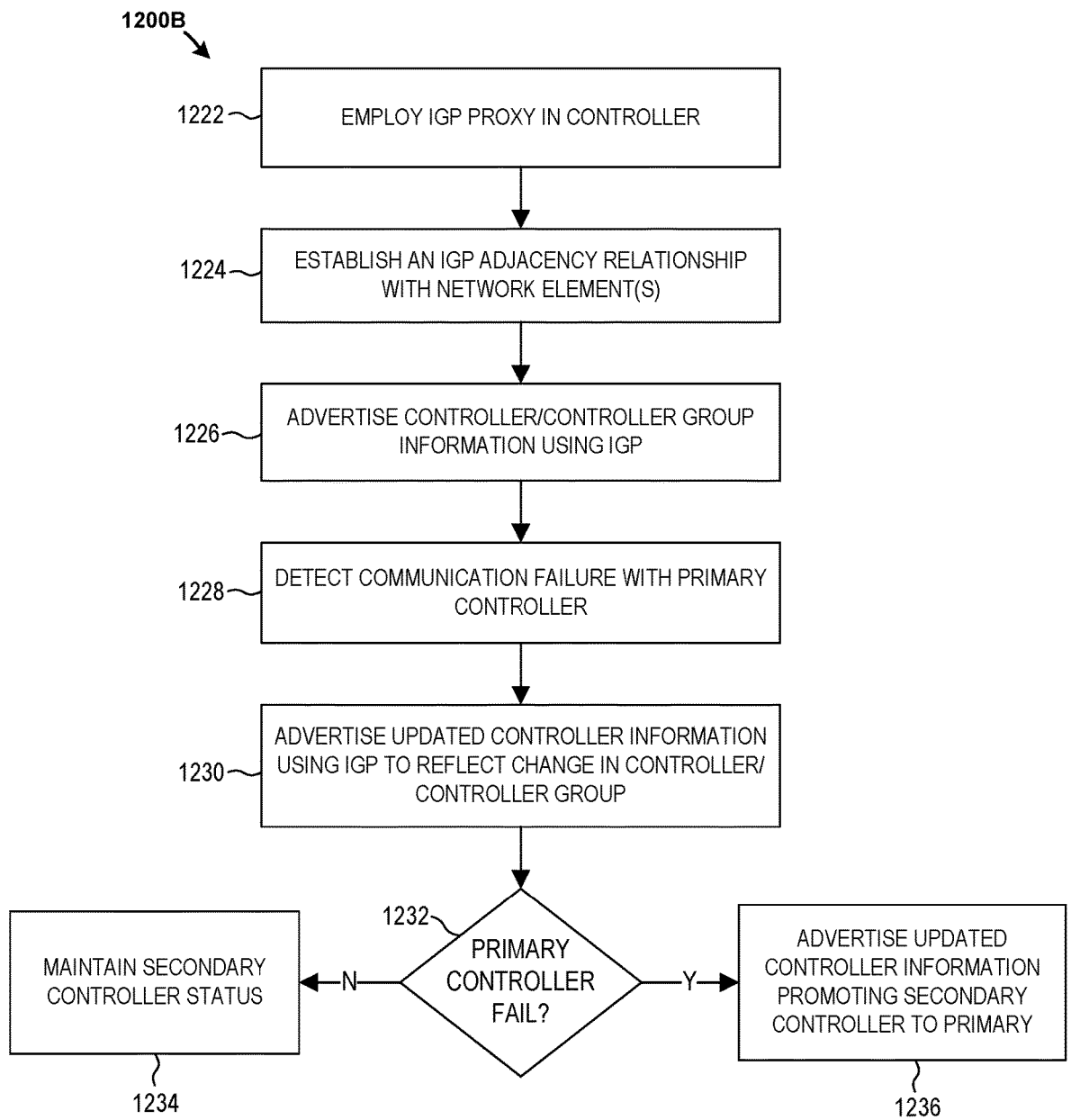
FIG. 12B is a flowchart illustrating a process performed by a secondary controller for providing network reliability in accordance with an embodiment of the present disclosure.

FIG. 12B is a flowchart illustrating a process 1200A performed by a secondary controller for providing network reliability in accordance with an embodiment of the present disclosure. In the depicted embodiment, the secondary controller is part of a controller cluster having two controllers, a primary controller and the secondary controller, for controlling a network. As stated above, the primary controller is configured to provide instructions to one or more network elements over a control channel or other channel for controlling the network such as, but not limited to, the controlling the routing of packets. The secondary controller does not provide any instructions to the network elements for controlling the network. The secondary controller is a backup controller in the event that the primary controller fails. At which point, the secondary controller will be promoted to the primary controller of the controller cluster and will control the network.

At step 1222, the secondary controller employs an IGP proxy in the controller. In an embodiment, the IGP proxy is a module configured to communicate information regarding the secondary controller and/or controller cluster/group to one or more network elements using IGP with extensions. At step 1224, the secondary controller establishes an IGP adjacency relation or relationship with the one or more network elements for the purpose of exchanging routing information. In an embodiment, to establish the IGP adjacency relationship, the IGP proxy of the secondary controller and the one or more network elements exchange a sequence of Hello packets to establish two-way communication between the IGP proxy of the controller and the one or more network elements. The IGP adjacency relationship is then formed by synchronizing their link state databases.

At step 1226, the secondary controller, via the IGP proxy of the secondary controller, advertises the controller information such as, but not limited to, the secondary controller's position within the controller cluster and the number of controllers connected to the secondary controller. For example, for OSPFv2, the secondary controller advertises an OSPFv2 RI Opaque LSA 700 that includes a Controllers TLV 600B containing C-bit field 608B=0, Position field 610B=2, NoControllers field 612B=2, OldPosition field 614B=2, and Controller ID field 620B=Primary Controller's ID and Secondary Controller's ID as depicted in FIG. 6B. Similarly, for OSPFv3, the secondary controller advertises an OSPFv3 RI Opaque LSA 800 that includes a Controllers TLV 600B containing C-bit field 608B=0, Position field 610B=2, NoControllers field 612B=2, OldPosition field 614B=2, and Controller ID field 620B=Primary Controller's ID and Secondary Controller's ID as depicted in FIG. 6B. For IS-IS, the secondary controller advertises an LSP (e.g., IS-IS LSP 1100 in FIG. 11) that includes a Controllers TLV 1000B containing C-bit field 1008B=0, Position field 1010B=2, NoControllers field 1012B=2, OldPosition field 1014B=2, and Controller ID field 1020B=Primary Controller's ID and Secondary Controller's ID as illustrated in FIG. 10B.

At step 1228, the secondary controller, via the IGP proxy of the secondary controller, detects a communication failure with the primary controller. The communication failure may be a connection failure between the primary and secondary controllers and/or a failure of the primary controller. In an embodiment, when the controller detects that the heartbeat of the primary controller has stopped, the secondary controller determines that the connection with the primary controller has failed. At this point, the secondary controller just knows that the primary controller is not communicating with the secondary controller, but does not know whether it is a communication/link failure or whether the primary controller has failed.

Figure 16:
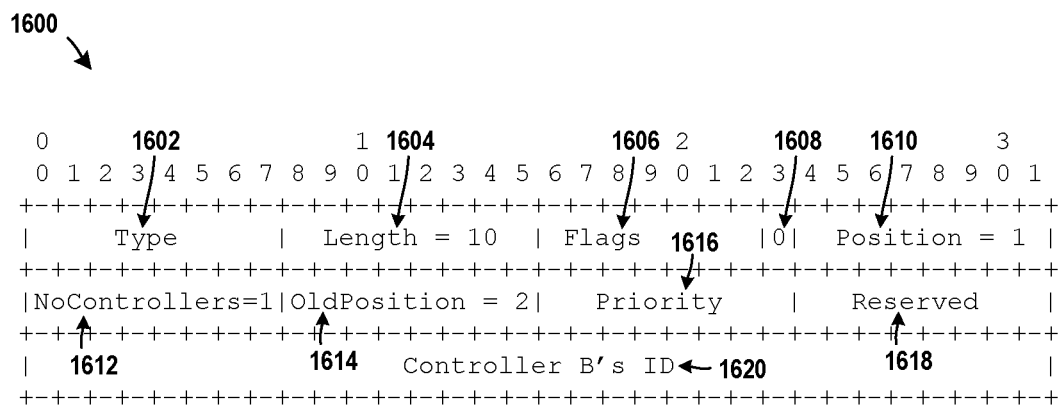
FIG. 16 is an example of a Controllers TLV in accordance with an embodiment of the present disclosure.

At step 1230, the secondary controller, via the IGP proxy of the controller, advertises updated controller information using IGP with the new controllers TLV extensions to reflect the change in the controller/controller group caused by the communication failure. For example, in an embodiment, for OSPF, the secondary controller advertises an LSA (e.g., OSPFv2 RI Opaque LSA 700 in FIG. 7 or OSPFv3 RI Opaque LSA 800 in FIG. 8) that includes a TLV 1400 containing C-bit field 1408=0, Position field 1414=1, NoControllers field 1412=1, OldPosition field 1414=2, and Controller ID field 1420=Secondary Controller's ID as depicted in FIG. 14. Similarly, in an embodiment, for IS-IS, when the primary controller or the link to the primary controller fails, the secondary controller advertises an LSP (e.g., LSP 1100 in FIG. 11) that includes a TLV 1600 containing C-bit field 1608=0, Position field 1616=1, NoControllers field 1612=1, OldPosition field 1614=2, and Controller ID field 1620=Secondary Controller's ID as depicted in FIG. 16.

At step 1232, the secondary controller determines whether the primary controller has failed (as opposed to just a communication/link failure between the primary controller and the secondary controller). In an embodiment, after a given time such as, but not limited to, 300 milli second, the secondary controller checks the link state database (LSDB) in the IGP proxy of the secondary controller to determine whether the IGP proxy for the primary controller is connected to at least one network element and is advertising its controller information (e.g., advertising an OSPFv2 RI Opaque LSA 700 in FIG. 7, an OSPFv3 RI Opaque LSA 800 in FIG. 8, or an LSP 1100 in FIG. 11) containing a Controllers TLV as described herein. When the primary controller is connected to at least one network element and is advertising its controller information, the secondary controller, at step 1232, determines that the primary controller is alive; otherwise, the secondary controller, at step 1232, determines that the primary controller is dead.

Figure 17:
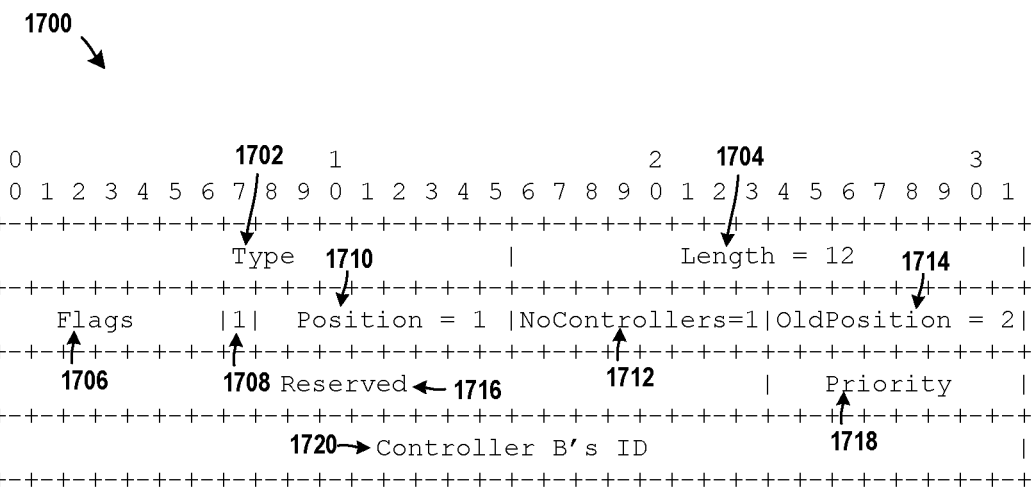
FIG. 17 is an example of a Controllers TLV in accordance with an embodiment of the present disclosure.
Figure 18:
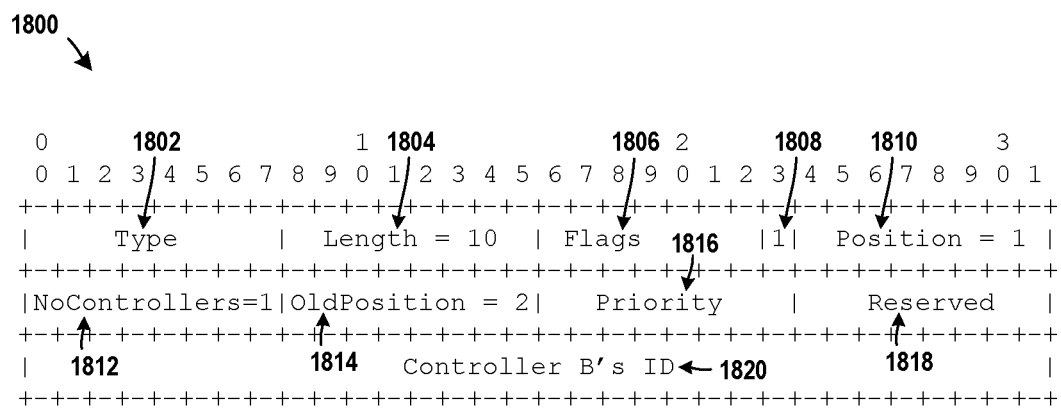
FIG. 18 is an example of a Controllers TLV in accordance with an embodiment of the present disclosure.

When the secondary controller determines that primary controller is dead/failed, the secondary controller, at step 1236, via the IGP proxy of the secondary controller, advertises the LSA or LSP with a Controllers TLV with updated controller information promoting the secondary controller to the primary controller for the controller cluster. For example, when the primary controller is dead, for OSPF, the secondary controller advertises an LSA (e.g., OSPFv2 RI Opaque LSA 700 or OSPFv3 RI Opaque LSA 800) that includes a Controllers TLV 1700 where C-bit field 1708=1, Position field 1710=1, NoControllers field 1712=1, OldPosition field 1714=2, Controller ID field 1720=Intent/New Primary Controller's ID (i.e., the secondary controller's ID) as depicted in FIG. 17 to promote the secondary controller to the primary controller for the controller cluster. Similarly, when the primary controller is dead, for IS-IS, the secondary controller advertises an LSP (e.g., FIG. 11) that includes the Controllers TLV 1800 where C-bit field 1808=1, Position field 1810=1, NoControllers field 1812=1, OldPosition field 1814=2, Controller ID field 1820=Intent/Primary Controller's ID as depicted in FIG. 18 to promote the secondary controller to the primary controller for the controller cluster.

When the secondary controller determines that primary controller is not dead, the secondary controller, at step 1234, maintains its status as the secondary/backup controller for the controller cluster.

FIG. 13 is an example of a Controllers TLV 1300 in accordance with an embodiment of the present disclosure. The Controllers TLV 1300 depicts an example of the Controllers TLV 500 for a controller cluster having two controllers such as depicted in FIG. 3. Specifically, the Controllers TLV 1300 depicts the controller information of the primary controller (e.g., Controller A 302 in FIG. 3) in a controller cluster having two controllers when the secondary controller or the link to the secondary controller fails. As stated above, the Controllers TLV 1300 when included in a RI LSA (e.g., as described in FIG. 7 and FIG. 8) advertises the information about the controller such as the number of controllers connected to the advertising controller (including itself).

In the depicted embodiment, the Controllers TLV 1300 includes a Type field 1302, a Length field 1304, a Flags field 1306, a C-bit field 1308, a Position field 1310, a NoControllers field 1312, a OldPosition field 1314, a Reserved field 1316, a Priority field 1318, and Controller ID field 1320. As stated above, the Type field 1302 is 16 bits and stores a value (TBD) that indicates that the extension is a Controllers TLV. The Length field 1304 is 12 to indicate the length of the value portion of the Controllers TLV 1300 in octets. The Flags field 1306 is 8 bits and includes the C-bit field 1308. In the depicted embodiment, the C-bit field 1308 is set to 1 to indicate that the position of the advertising controller is the position of the current active primary controller. The Position field 1310 is set to 1 to indicate that the controller that is advertising the LSA (i.e., Controller A 302 in FIG. 3) is currently in the first position in the controller cluster or group, making the advertising controller the current active primary controller of the controller cluster. In the depicted embodiment, the NoControllers field 1312 is set to 1 to indicate that there is only one controller connected to the controller (including itself) that is advertising controller, meaning the advertising controller has no connection with any other controller in the controller cluster. The OldPosition field 1314 is set to 1 to indicate the old position of the controller in the controller cluster prior to the controller cluster being split. The Reserved field 1316 is set to zero for transmission and ignored for reception. The Priority field 1318 indicates the priority of the controller to be elected as a primary controller. The Controller ID field 1320 contains the controller ID of the only controller in the controller cluster or group (e.g., the ID of the primary Controller A in FIG. 3).

FIG. 14 is an example of a Controllers TLV 1400 in accordance with an embodiment of the present disclosure. The Controllers TLV 1400 depicts an example of the Controllers TLV 500 for a controller cluster having two controllers such as depicted in FIG. 3. Specifically, the Controllers TLV 1400 depicts the controller information of the secondary controller (e.g., Controller B 302 in FIG. 3) in a controller cluster having two controllers. As stated above, the Controllers TLV 1400 when included in a RI LSA (e.g., as described in FIG. 7 and FIG. 8) advertises the updated information about the controllers such as the number of controllers connected to the secondary controller (including itself) when the primary controller or the link to the primary controller fails.

In the depicted embodiment, the Controllers TLV 1400 includes a Type field 1402, a Length field 1404, a Flags field 1406, a C-bit field 1408, a Position field 1410, a NoControllers field 1412, a OldPosition field 1414, a Reserved field 1416, a Priority field 1418, and Controller ID field 1420. The Type field 1402 is 16 bits and stores a value (TBD) that indicates that the extension is a Controllers TLV. The Length field 1404 is 12 to indicate the length of the value portion of the Controllers TLV 1400 in octets. The Flags field 1406 is 8 bits and includes the C-bit field 1408. In the depicted embodiment, the C-bit field 1408 is set to 0 to indicate that the position of the advertising controller is not the position of the current active primary controller. The Position field 1410 is set to 1 to indicate that the controller that is advertising the LSA (i.e., Controller B 302 in FIG. 3) is currently in the first position in the controller cluster or group. In the depicted embodiment, the NoControllers field 1412 is set to 1 to indicate that there is only one controller connected to the controller (including itself) that is advertising controller, meaning the advertising controller has no connection with any other controller in the controller cluster. The OldPosition field 1414 is set to 2 to indicate the old position of the controller in the controller cluster prior to the controller cluster being split. The Reserved field 1416 is set to zero for transmission and ignored for reception. The Priority field 1418 indicates the priority of the controller to be elected as a primary controller. The Controller ID field 1420 contains the controller ID of the only controller in the controller cluster or group (e.g., the ID of the Controller B in FIG. 3).

FIG. 15 is an example of a Controllers TLV 1500 in accordance with an embodiment of the present disclosure. The Controllers TLV 1500 depicts an example of the Controllers TLV 900 for a controller cluster having two controllers such as depicted in FIG. 3. Specifically, the Controllers TLV 1500 depicts the controller information of the primary controller (e.g., Controller A 302 in FIG. 3) in a controller cluster having two controllers when the secondary controller or the link to the secondary controller fails. As stated above, the Controllers TLV 1500 when included in a LSP (e.g., as described in FIG. 11) advertises the information about the controller such as the number of controllers connected to the advertising controller (including itself).

The Controllers TLV 1500 includes a Type field 1502, a Length field 1504, a Flags field 1506, a C-bit field 1508, a Position field 1510, a NoControllers field 1512, a OldPosition field 1514, a Priority field 1516, a Reserved field 1518, and Controller ID field 1520. The Type field 1502 specifies a type value (TBD) that indicates that the data format is a Controllers TLV. The Length field 1504 is 10 to indicate the length of the value portion in octets. The Flags field 1506 can be used to indicate one or more flags. The C-bit field 1508 is set to 1 to indicate that the position of the advertising controller is the position of the current active primary controller. The Position field 1510 indicates the current/intent position of the controller in the controller cluster or group (e.g., 1=primary, 2=secondary, etc.). Because the C-bit field 1508 is set to 1 (C=1) and Position=1, this indicates that the controller is the current active primary controller of the network. The NoControllers field 1512 is set to 1 to indicate that there is only one controller connected to the controller (including itself) that is advertising controller, meaning the advertising controller has no connection with any other controller in the controller cluster. The OldPosition field 1514 is set to 1 to indicate the old position of the controller in the controller cluster prior to the controller cluster being split. The Priority field 1516 indicates the priority of the controller to be elected as a primary controller. The Reserved field 1518 is set to zero for transmission and ignored for reception. The Controller ID field 1520 contains the controller ID of the only controller in the controller cluster or group (e.g., the ID of the primary Controller A in FIG. 3).

FIG. 16 is an example of a Controllers TLV 1600 in accordance with an embodiment of the present disclosure. The Controllers TLV 1600 depicts an example of the Controllers TLV 900 for a controller cluster having two controllers such as depicted in FIG. 3. Specifically, the Controllers TLV 1600 depicts the controller information of the secondary controller (e.g., Controller B 302 in FIG. 3) in a controller cluster having two controllers. As stated above, the Controllers TLV 1600 when included in a LSP (e.g., LSP 1100 in FIG. 11) advertises the updated information about the controllers such as the number of controllers connected to the secondary controller (including itself) when the primary controller or the link to the primary controller fails.

The Controllers TLV 1600 includes a Type field 1602, a Length field 1604, a Flags field 1606, a C-bit field 1608, a Position field 1610, a NoControllers field 1612, a OldPosition field 1614, a Priority field 1616, a Reserved field 1618, and Controller ID field 1620. The Type field 1602 specifies a type value (TBD) that indicates that the data format is a Controllers TLV. The Length field 1604 is 10 to indicate the length of the value portion in octets. The Flags field 1606 can be used to indicate one or more flags. The C-bit field 1608 is set to 0 to indicate that the position of the advertising controller is not the position of the current active primary controller. The Position field 1610 is set to 1 to indicate that the advertising controller (i.e., Controller B 304 in FIG. 3) is currently in the first position in the controller cluster or group. The NoControllers field 1612 is set to 1 to indicate the number of controllers connected to the controller that is advertising the Controllers TLV 1600 (including itself), meaning no controller is connected to the secondary controller at the moment. The OldPosition field 1614 is set to 2 to indicate the old position of the controller in the controller cluster prior to the controller cluster being split. The Priority field 1616 indicates the priority of the controller to be elected as a primary controller. The Reserved field 1618 is set to zero for transmission and ignored for reception. The Controller ID field 1620 contains the controller ID of the only controller in the controller cluster or group (e.g., the ID of Controller B in FIG. 3).

FIG. 17 is an example of a Controllers TLV 1700 in accordance with an embodiment of the present disclosure. The Controllers TLV 1700 depicts an example of the Controllers TLV 500 for a controller cluster having two controllers such as depicted in FIG. 3. Specifically, the Controllers TLV 1700 depicts the controller information of the secondary controller (e.g., Controller B 302 in FIG. 3) in a controller cluster having two controllers. As stated above and FIG. 12, the Controllers TLV 1700 when included in a RI LSA (e.g., as described in FIG. 7 and FIG. 8) advertises the updated controller information promoting the secondary controller to the primary controller for the controller cluster when the primary controller has failed.

In the depicted embodiment, the Controllers TLV 1700 includes a Type field 1702, a Length field 1704, a Flags field 1706, a C-bit field 1708, a Position field 1710, a NoControllers field 1712, a OldPosition field 1714, a Reserved field 1716, a Priority field 1718, and Controller ID field 1720. The Type field 1702 is 16 bits and stores a value (TBD) that indicates that the extension is a Controllers TLV. The Length field 1704 is 12 to indicate the length of the value portion of the Controllers TLV 1700 in octets. The Flags field 1706 is 8 bits and includes the C-bit field 1708. In the depicted embodiment, the C-bit field 1708 is set to 1 to indicate that the position of the advertising controller is the position of the current active primary controller. The Position field 1710 is set to 1 to indicate that the controller that is advertising the LSA (i.e., Controller B 302 in FIG. 3) is currently in the first position in the controller cluster or group. The NoControllers field 1712 is set to 1 to indicate that there is only one controller connected to the controller (including itself) that is advertising controller, meaning the advertising controller has no connection with any other controller in the controller cluster. The OldPosition field 1714 is set to 2 to indicate the old position of the controller in the controller cluster prior to the controller cluster being split. The Reserved field 1716 is set to zero for transmission and ignored for reception. The Priority field 1718 indicates the priority of the controller to be elected as a primary controller. The Controller ID field 1720 contains the controller ID of the only controller in the controller cluster or group (i.e., the ID of the primary Controller B in FIG. 3).

FIG. 18 is an example of a Controllers TLV 1800 in accordance with an embodiment of the present disclosure. The Controllers TLV 1800 depicts an example of the Controllers TLV 500 for a controller cluster having two controllers such as depicted in FIG. 3. Specifically, the Controllers TLV 1800 depicts the controller information of the secondary controller (e.g., Controller B 302 in FIG. 3) in a controller cluster having two controllers. As stated above and FIG. 12, the Controllers TLV 1800 when included in a LSP (e.g., LSP 1100 in FIG. 11) advertises the updated controller information promoting the secondary controller to the primary controller for the controller cluster when the primary controller has failed.

The Controllers TLV 1800 includes a Type field 1802, a Length field 1804, a Flags field 1806, a C-bit field 1808, a Position field 1810, a NoControllers field 1812, a OldPosition field 1814, a Priority field 1816, a Reserved field 1818, and Controller ID field 1820. The Type field 1802 specifies a type value (TBD) that indicates that the data format is a Controllers TLV. The Length field 1804 is 10 to indicate the length of the value portion in octets. The Flags field 1806 can be used to indicate one or more flags. The C-bit field 1808 is set to 1 to indicate that the position of the advertising controller is the position of the current active primary controller. The Position field 1810 is set to 1 to indicate that the advertising controller (i.e., Controller B 304 in FIG. 3) is currently in the first position in the controller cluster or group. The NoControllers field 1812 is set to 1 to indicate the number of controllers connected to the controller that is advertising the Controllers TLV 1800 (including itself), meaning no controller is connected to the secondary controller at the moment. The OldPosition field 1814 is set to 2 to indicate the old position of the controller in the controller cluster prior to the controller cluster being split. The Priority field 1816 indicates the priority of the controller to be elected as a primary controller. The Reserved field 1818 is set to zero for transmission and ignored for reception. The Controller ID field 1820 contains the controller ID of the only controller in the controller cluster or group (e.g., the ID of the primary Controller B in FIG. 3).

Figure 19:
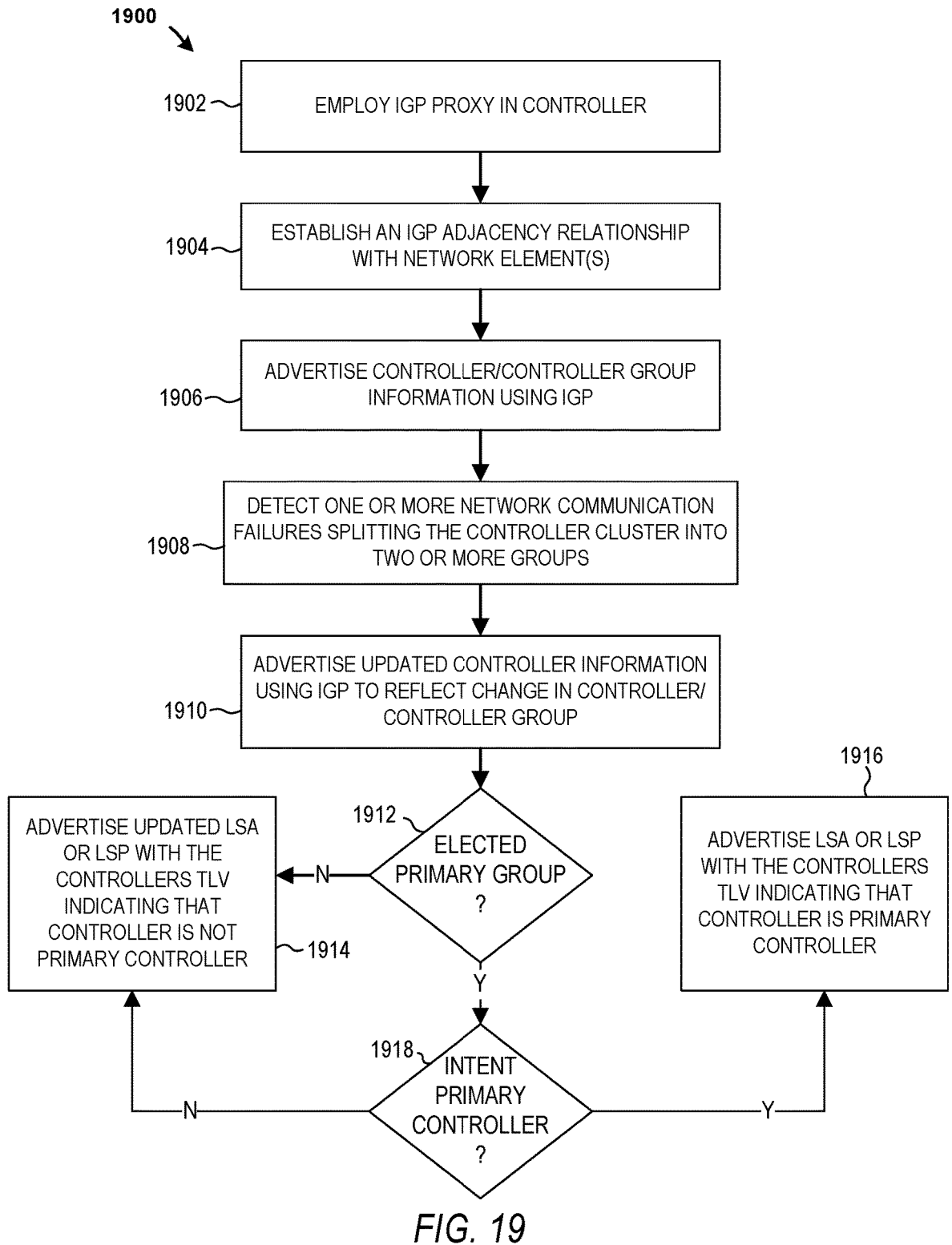
FIG. 19 is a flowchart illustrating a process performed by a controller for providing network reliability in accordance with an embodiment of the present disclosure.

FIG. 19 is a flowchart illustrating a process 1900 implemented by a controller for providing network reliability in accordance with an embodiment of the present disclosure. In the depicted embodiment, the process 1900 is implemented by a controller that is part of a controller cluster having more than two controllers (e.g., primary, secondary, . . . , nth controller as depicted in FIG. 4). As stated above, when multiple network failures occur, the controller cluster 410 may be split into one or more groups of controllers. For example, referring to FIG. 4, when the communication link between Controller A 402 and Controller B 404, the communication link between Controller A 402 and Controller N 408, and the communication link between Controller C 406 and Controller N 408 all fail, then the controller cluster 410 is split into two groups, group 1 comprising Controller A 402 and Controller C 406, and group 2 comprising Controller B 404 and Controller N 408. Group 1 (Controller A 402 and Controller C 406) and group 2 (Controller B 404 and Controller N 408) are referred to in the preceding figures. Currently, a separated group of controllers, without using the IGP proxy and Controllers TLV disclosed herein, cannot determine whether it should elect a new primary controller for the network 120 because the separated groups of controllers are unable to obtain information about the other separated groups. The process 1900 addresses this issue by enabling the separated controller groups to obtain knowledge of the other separated controller groups so that a proper group and controller can be elected as the new primary controller of the network.

The process 1900 begins, at step 1902, with the controller employing an IGP proxy that is configured to communicate information regarding the controller or controller cluster/group to one or more network elements using IGP with extensions. At step 1904, the controller establishes an IGP adjacency relation or relationship with the one or more network elements for the purpose of exchanging routing information. In an embodiment, to establish the IGP adjacency relationship, the IGP proxy of the controller and the one or more network elements exchange a sequence of Hello packets to establish two-way communication between the IGP proxy of the controller and the one or more network elements. The IGP adjacency relationship is then formed by synchronizing their link state databases.

During normal network operations, the controller, at step 1906, via the IGP proxy of the controller, advertises the controller information such as, but not limited to, the controller's position within a controller cluster and the number of controllers connected to the advertising controller. In one embodiment, only the primary controller and the intent primary controller of a cluster or a group originates the LSA or LSP with the Controllers TLV containing the information about the controllers in the cluster or group. An intent primary controller is a controller that has the highest priority ranking to become the primary controller in a cluster group (e.g., Controller B 404 is the intent primary controller for group 2 because it has the highest priority ranking to become the primary controller in group 2).

Figure 20A:
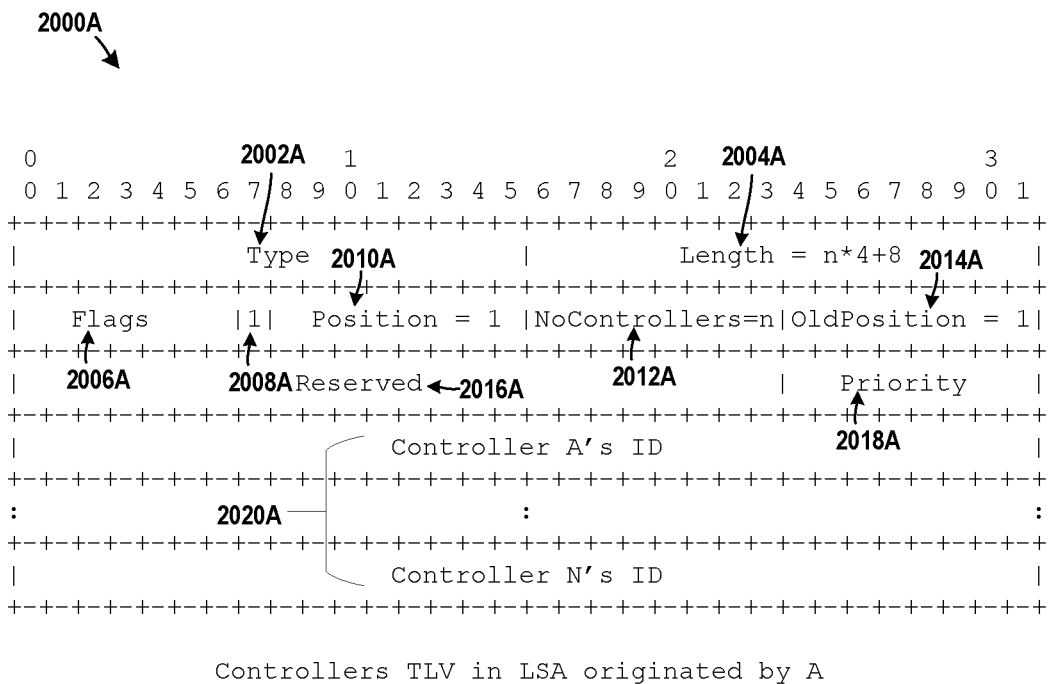
FIG. 20A is an example of a Controllers TLV in accordance with an embodiment of the present disclosure.
Figure 21A:
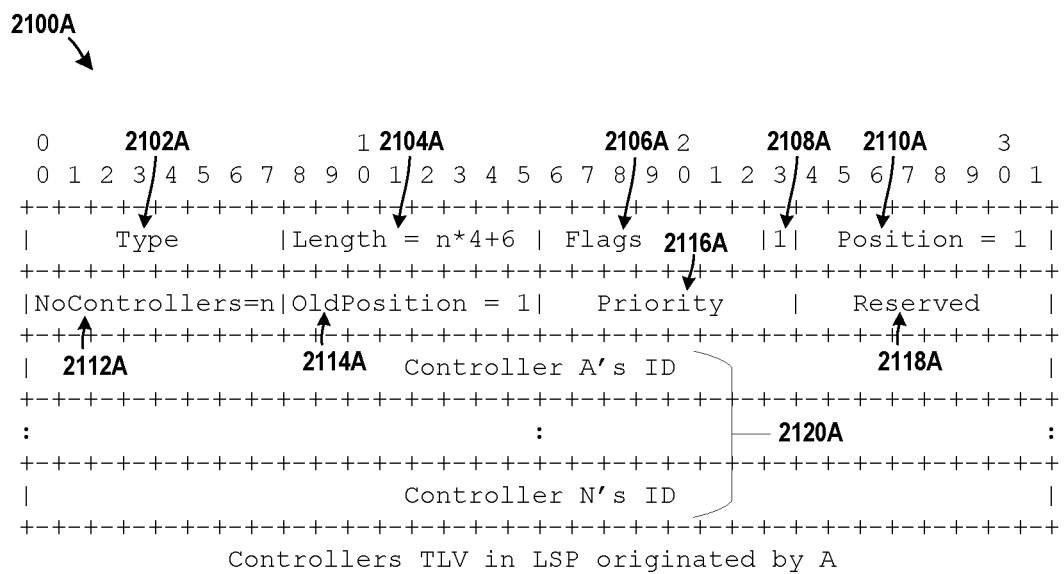
FIG. 21A is an example of a Controllers TLV in accordance with an embodiment of the present disclosure.

In an embodiment, for OSPF, when Controller A 402 is the primary controller, during normal network operations, the IGP proxy of Controller A originates an LSA (e.g., OSPFv2 RI Opaque LSA 700 in FIG. 7 or OSPFv3 RI Opaque LSA 800 in FIG. 8) that includes a Controllers TLV containing C=1, Position=1, NoControllers=n, OldPosition=1, Priority of Primary Controller, Primary Controller's ID, secondary controller's ID, . . . , and nth Controller's ID as depicted by Controllers TLV 2000A in FIG. 20A. For IS-IS, when Controller A 402 is the primary controller, the IGP proxy of Controller A originates an LSP (e.g., LSP 1100 in FIG. 11) that includes a Controllers TLV 2100A as depicted in FIG. 21A.

In another embodiment, the IGP proxy in every controller originates the LSA or LSP with the Controllers TLV containing the information about the controllers in the cluster or group. For example, for any non-primary controller J (where j>1), the IGP proxy of controller J originates an LSA or LSP that includes the Controllers TLV containing C=0, Position j, NoControllers=n, OldPosition=j, the priority of the j-th controller, Primary Controller's ID, secondary controller's ID, . . . , and nth Controller's ID. For instance, when Controller B is the secondary controller, the IGP proxy of Controller B originates an LSA that includes the Controllers TLV 2000B in FIG. 20B, or an LSP that includes the Controllers TLV 2100B in FIG. 21B.

At step 1908, the controller, via the IGP proxy of the controller, detects one or more network communication failures with the other controllers in the controller cluster that result in splitting the controller cluster into two or more groups of controllers. The communication failure may be a one or more connection failures between two controllers and/or a failure of one or more of the controllers within the controller cluster. In an embodiment, when the controller detects that the heartbeat of another controller in the controller cluster has stopped, the controller knows that the other controlling is no longer part of the same controller group and that the controller cluster (e.g., controller cluster 410) has split into two or more controller groups. In an embodiment, when the controller cluster splits into two or more groups of controllers, each group of controllers elects its intent primary controller, secondary controller, and so on within the group (e.g., based on the priorities, IDs and old positions of the controllers in the group). For example, in an embodiment, Controller A is elected as the intent primary and Controller C is the secondary controller in group 1; and Controller B is elected as the intent primary and Controller N is the secondary controller in group 2.

Figure 22A:
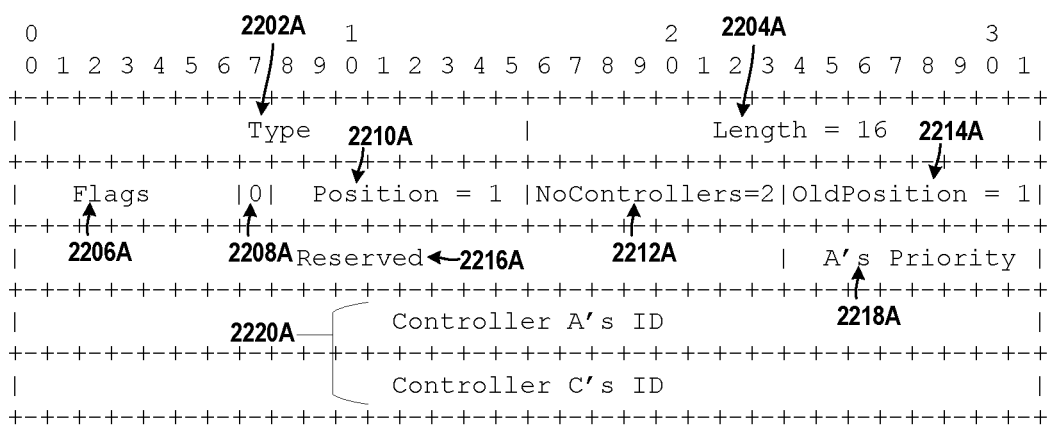
FIG. 22A is an example of a Controllers TLV in accordance with an embodiment of the present disclosure.
Figure 22B:
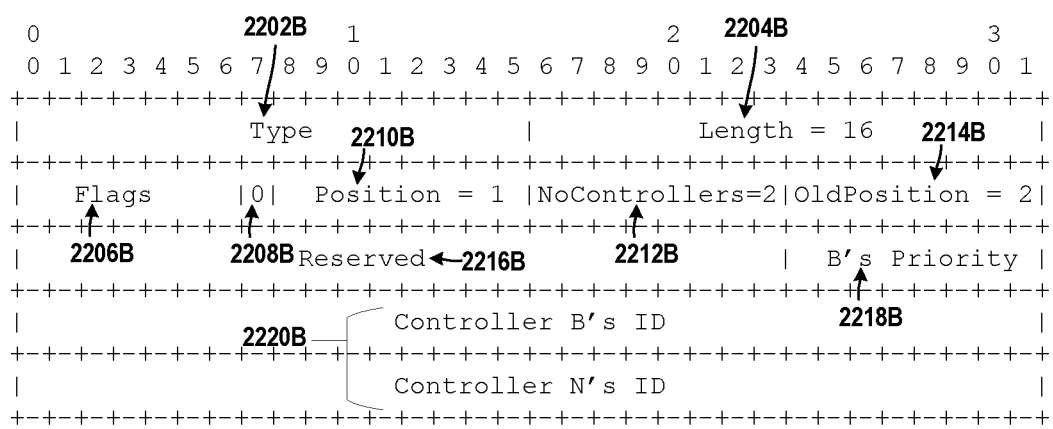
FIG. 22B is an example of a Controllers TLV in accordance with an embodiment of the present disclosure.

At step 1910, the controller, via the IGP proxy of the controller, advertises updated controller information using IGP with the new controllers TLV to reflect the change in the controller/controller group. For example, in an embodiment, each of the intent primary controllers A and B originates the LSA or LSP with the Controllers TLV containing the updated information about the controllers in its group. The LSA or LSP is distributed/advertised to every node running IGP including every live controller. For instance, assuming the intent primary Controller A was the previous primary controller and has not failed, Controller A, via the IGP proxy of the Controller A, advertises an LSA or LSP with a Controllers TLV containing C-bit field=0, Position field=1, NoControllers field=n (n is the number of controllers in the group that the intent primary controller is connected after the failures, in this case n=2), OldPosition field=1, Priority field=Priority of Intent Primary Controller, and Controller ID field=Intent Primary Controller's ID and IDs of the other controllers connected as shown in FIG. 22A (for LSA) and FIG. 23A (for LSP). For any non-primary controller J (where j>1), the IGP proxy of controller J originates an LSA or LSP that includes the Controllers TLV containing C-bit field=0, Position field=i, where i is the intent position in the group, NoControllers field=n (n is the number of controllers in the group that the controller is connected after the failures), OldPosition field=j, Priority field=controller j's Priority. When i=1 then the old j-th controller is the intent primary controller in the group. For instance, assuming the Controller B is elected as the intent primary and Controller N is the secondary controller in group 2, Controller B, via the IGP proxy of the controller B, advertises an LSA or LSP with a Controllers TLV containing C-bit field=0, Position field=1, NoControllers field=2, OldPosition field=2, Priority field=Controller B's Priority, Controller ID field=Controller B's ID and Controller N's ID as depicted in FIG. 22B (for LSA) and FIG. 23B (for LSP).

At step 1912, the controller, after a given time such as 300 milli seconds, determines, via the IGP proxy of the controller, whether the controller is the part of the group that is elected as the primary group among the split controller groups. In an embodiment, the group with a maximum number of controllers based on the advertised updated controller information (from step 1910) is elected as the primary controller group responsible for controlling the network. A new primary controller, secondary controller, and so on are elected from the elected primary group based on the positions of the controllers in the elected primary group. In an embodiment, when both group 1 (Controller A and Controller C) and group 2 (Controller B and Controller N) have an equal number of controllers, the group with the higher OldPosition (OldPosition in group 1 is higher than that in group 2) is elected as the primary group, and the intent primary controller in the primary group is determined as the active primary controller.

When the controller, determines, via the IGP proxy of the controller, that the controller is not part of the group that is elected as the primary group among the split controller groups, the IGP proxy of the controller, at step 1914, advertises an updated LSA or LSP with the Controllers TLV indicating that the controller is not primary controller (e.g., advertises the LSA or LSP with the Controllers TLV containing C-bit field=0, Position field=1, NoControllers field=n, OldPosition field=1 (if previous primary controller) or j (if previously non-primary controller), Priority field=Controllers' Priority, Controller ID field=the IDs of the controllers in the group).

Figure 24:
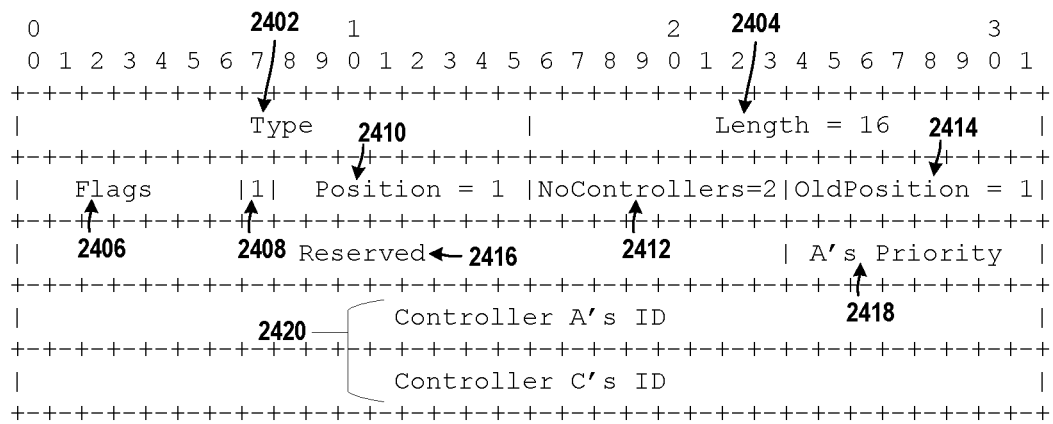
FIG. 24 is an example of a Controllers TLV in accordance with an embodiment of the present disclosure.

When the controller, determines, via the IGP proxy of the controller, that the controller is part of the group that is elected as the primary group among the split controller groups, the IGP proxy of the controller, at step 1918, determines whether the controller is the intent controller of the elected primary group (e.g., based on the controllers' position within the group). In an embodiment, when the controller is part of the elected primary group and is not the intent controller, the controller, at step 1914, advertises, via the IGP proxy of the controller an updated LSA or LSP with the Controllers TLV indicating that the controller is not primary controller (e.g., with Controllers TLV containing C-bit field=0, Position field=1, NoControllers field=n, OldPosition field=j). When the controller is the intent primary controller of the elected primary group, the controller, at step 1916, advertises, via the IGP proxy of the controller an updated LSA or LSP with the Controllers TLV indicating that the controller is promoted to the active primary controller of the network (e.g., advertises the LSA or LSP with the Controllers TLV containing C-bit field=1, Position field=1, NoControllers field=n, OldPosition field=1, Controller ID field=IDs of the controllers in the group). For example, in the given example, the intent primary Controller A in the primary group (i.e., group 1) originates the LSA or LSP with the Controllers TLV containing C-bit field=1, Position field=1, NoControllers field=2, OldPosition field=1, Priority field=Controller A's Priority, Controller ID field=Controller A's ID and Controller C's ID as depicted in FIG. 24 (for LSA) and FIG. 25 (for LSP).

Figure 27:
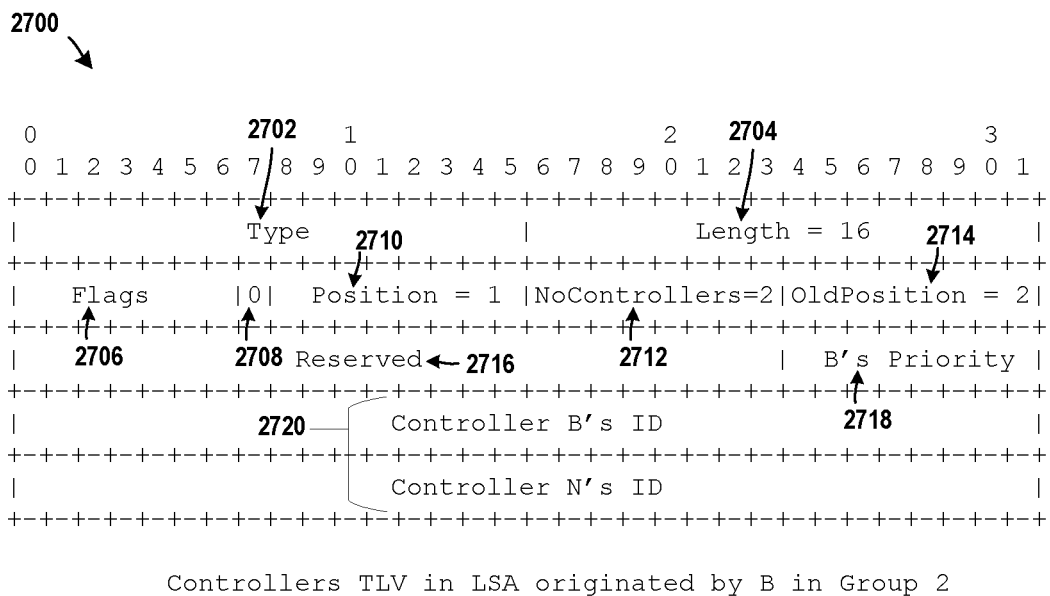
FIG. 27 is an example of a Controllers TLV in accordance with an embodiment of the present disclosure.

In another embodiment or second example, assume, at step 1908, that Controller A itself has failed along with the communication link between Controller A 402 and Controller B 404, the communication link between Controller A 402 and Controller N 408, and the communication link between Controller C 406 and Controller N 408. These failures result in splitting the controller cluster 410 into two groups, group 1 comprising Controller C 406, and group 2 comprising Controller B 404 and Controller N 408. In this embodiment, Controller C is elected as the intent primary in group 1. Controller C, at step 1910, via the IGP proxy of the controller C, advertises an LSA or LSP with a Controllers TLV containing C-bit field=0, Position field=1, NoControllers field=1, OldPosition field=3, Priority field=Controller C's Priority, and Controller ID field=Controller C's ID as shown in FIG. 26 (for LSA) and FIG. 28 (for LSP). Assuming that Controller B is elected as the intent primary controller and Controller N is the secondary controller in group 2, Controller B, at step 1910, via the IGP proxy of the controller B, advertises an LSA or LSP with a Controllers TLV containing C-bit field=0, Position field=1, NoControllers field=2, OldPosition field=2, Priority field=Controller B's Priority, and Controller ID field=Controller B's ID and Controller N's ID as depicted in FIG. 27 (for LSA) and FIG. 29 (for LSP).

Figure 30:
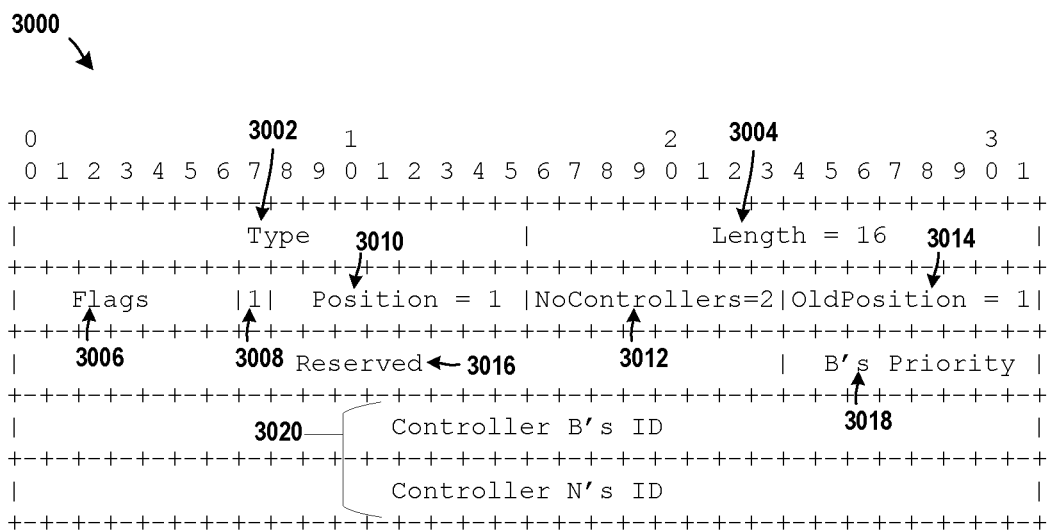
FIG. 30 is an example of a Controllers TLV in accordance with an embodiment of the present disclosure.

At step 1912, the controller elects group 2 as the primary group among the split controller groups because group 2 includes more controllers than group 1. Controller B, being the intent primary controller of the elected primary group, originates, at step 1916, the LSA or LSP with the Controllers TLV containing C-bit field=1, Position field=1, NoControllers field=2, OldPosition field=1, Priority field=B's Priority, and Controller ID field=Controller B's ID and Controller N's ID as depicted in FIG. 30 (for LSA) and FIG. 31 (for LSP) to indicate that it is the active primary controller of the network.

FIG. 20A is an example of a Controllers TLV 2000A in accordance with an embodiment of the present disclosure. The Controllers TLV 2000A depicts an example of the Controllers TLV 500 for a controller cluster having more than two controllers (e.g., primary, secondary, . . . , nth controller as depicted in FIG. 4). Specifically, the Controllers TLV 2000A depicts the controller information of the primary controller (e.g., Controller A 402 in FIG. 4) in a controller cluster having more than two controllers during normal operations. As stated above, the Controllers TLV 2000A when included in a RI LSA (e.g., as described in FIG. 7 and FIG. 8) advertises the information about the controller and the controller cluster.

In the depicted embodiment, the Controllers TLV 2000A includes a Type field 2002A, a Length field 2004A, a Flags field 2006A, a C-bit field 2008A, a Position field 2010A, a NoControllers field 2012A, a OldPosition field 2014A, a Reserved field 2016A, a Priority field 2018A, and Controller ID field 2020A. The Type field 2002A is 16 bits and stores a value (TBD) that indicates that the data format is a Controllers TLV. The Length field 2004A is n*4+8 to indicate the length of the value portion of the Controllers TLV 2000A in octets, where n is the number of controllers in the controller cluster. For example, when there are 6 controllers in the controller cluster, then the Length field 2004A is 6*4+8=32. The Flags field 2006A is 8 bits and includes the C-bit field 2008A. In the depicted embodiment, the C-bit field 2008A is set to 1 to indicate that the position of the advertising controller is the position of the current active primary controller. The Position field 2010A is set to 1 to indicate that the advertising controller is currently in the first position in the controller cluster or group. In the depicted embodiment, the values of the C-bit field 2008A and the Position field 2010A (C=1 and P=1) indicate to network elements receiving the LSA containing the Controllers TLV 2000A that the LSA is advertised by the current active primary controller. In the depicted embodiment, the NoControllers field 2012A is set to n to indicate that there are n controllers (including itself) connected to the advertising controller. The OldPosition field 2014A is set to 1 to indicate the old position of the controller in the controller cluster prior to the controller cluster being split. In an embodiment, the Reserved field 2016A is set to zero for transmission and ignored for reception. The Priority field 2018A indicates the priority of the controller to be elected as a primary controller. The Controller ID field 2020A contains the controller IDs of the n controllers in the controller cluster or group (i.e., Controller A's ID, Controller B's ID, . . . , and Controller N's ID).

FIG. 20B is an example of a Controllers TLV 2000B in accordance with an embodiment of the present disclosure. The Controllers TLV 2000B depicts an example of the Controllers TLV 500 for a controller cluster having more than two controllers (e.g., primary, secondary, . . . , nth controllers as depicted in FIG. 4). Specifically, the Controllers TLV 2000B depicts the controller information of a secondary controller in a controller cluster having more than two controllers during normal operations (e.g., secondary, . . . , and nth controllers as depicted in FIG. 4). As stated above, the Controllers TLV 2000B when included in a RI LSA (e.g., as described in FIG. 7 and FIG. 8) advertises the information about the controller and controller cluster/group.

In the depicted embodiment, the Controllers TLV 2000B includes a Type field 2002B, a Length field 2004B, a Flags field 2006B, a C-bit field 2008B, a Position field 2010B, a NoControllers field 2012B, a OldPosition field 2014B, a Reserved field 2016B, a Priority field 2018B, and Controller ID field 2020B. The Type field 2002B is 16 bits and stores a value (TBD) that indicates that the data format is a Controllers TLV. The Length field 2004B is n*4+8 to indicate the length of the value portion of the Controllers TLV 2000B in octets, where n is the number of controllers in the controller cluster. The Flags field 2006B is 8 bits and includes the C-bit field 2008B. In the depicted embodiment, the C-bit field 2008B is set to 0 to indicate that the position of the advertising controller is not the position of the current active primary controller. The Position field 2010B is set to 2 to indicate that the controller that is advertising the LSA (i.e., Controller B 306 in FIG. 3) is currently in the second position in the controller cluster or group. The NoControllers field 2012B is set to n to indicate that there are n controllers (including itself) connected to the advertising controller. The OldPosition field 2014B is set to 2 to indicate the old position of the controller in the controller cluster prior to the controller cluster being split. In an embodiment, the Reserved field 2016B is set to zero for transmission and ignored for reception. The Priority field 2018B indicates the priority of the controller to be elected as a primary controller. The Controller ID field 2020B contains the controller IDs of the n controllers in the controller cluster or group (i.e., Controller A's ID, Controller B's ID, . . . , and Controller N's ID).

FIG. 21A is an example of a Controllers TLV 2100A in accordance with an embodiment of the present disclosure. The Controllers TLV 2100A depicts an example of the Controllers TLV 900 for a controller cluster having more than two controllers (e.g., primary, secondary, . . . , nth controller as depicted in FIG. 4). Specifically, the Controllers TLV 2100A depicts the controller information of the primary controller (e.g., Controller A 402 in FIG. 4) in a controller cluster having more than two controllers during normal operations. As stated above in FIG. 19, the Controllers TLV 2100A when included in a LSP (e.g., LSP 1100 in FIG. 11) advertises the information about the controller.

The Controllers TLV 2100A includes a Type field 2102A, a Length field 2104A, a Flags field 2106A, a C-bit field 2108A, a Position field 2110A, a NoControllers field 2112A, a OldPosition field 2114A, a Priority field 2116A, a Reserved field 2118A, and Controller ID field 2120A. The Type field 2102A specifies a type value (TBD) that indicates that the data format is a Controllers TLV. The Length field 2104A is n*4+6 to indicate the length of the value portion of the Controllers TLV 2100A in octets, where n is the number of controllers in the controller cluster. The Flags field 2106A can be used to indicate one or more flags. The C-bit field 2108A is set to 1 to indicate that the position of the advertising controller is the position of the current active primary controller. The Position field 2110A is set to 1 to indicate the current/intent position of the controller in the controller cluster or group (e.g., 1=primary, 2=secondary, etc.). The NoControllers field 2112A is set to n to indicate that there are n controllers (including itself) connected to the advertising controller. The OldPosition field 2114A is set to 1 to indicate the old position of the controller in the controller cluster prior to the controller cluster being split. The Priority field 2116A indicates the priority of the controller to be elected as a primary controller. The Reserved field 2118A is set to zero for transmission and ignored for reception. The Controller ID field 2120A contains the controller IDs of the n controllers in the controller cluster or group (i.e., Controller A's ID, Controller B's ID, . . . , and Controller N's ID).

Figure 21B:
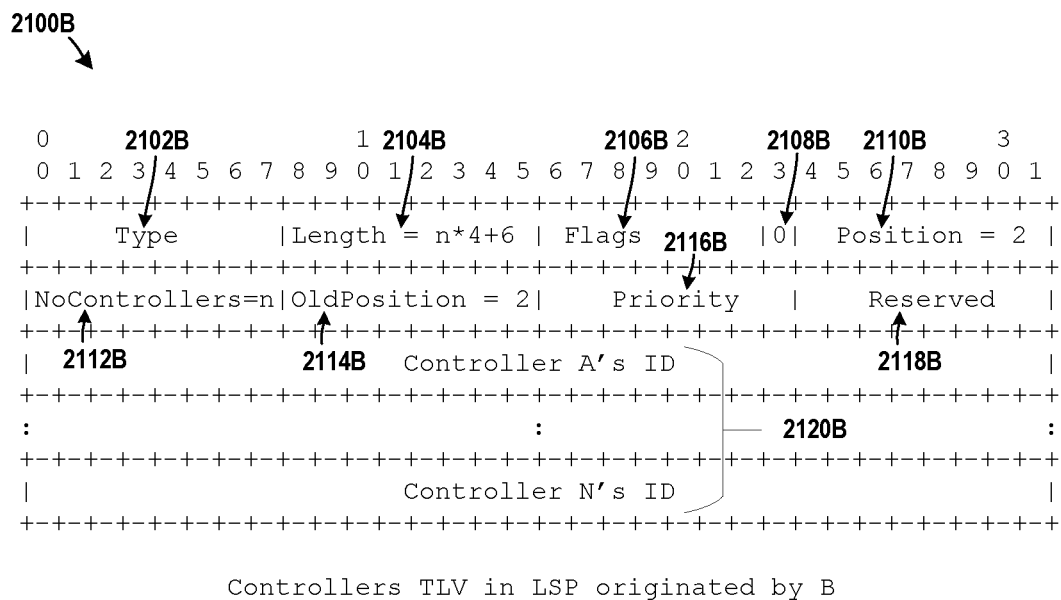
FIG. 21B is an example of a Controllers TLV in accordance with an embodiment of the present disclosure.

FIG. 21B is an example of a Controllers TLV 2100B in accordance with an embodiment of the present disclosure. The Controllers TLV 2100B depicts an example of the Controllers TLV 900 for a controller cluster having more than two controllers (e.g., primary, secondary, . . . , nth controllers as depicted in FIG. 4). Specifically, the Controllers TLV 2100B depicts the controller information of a secondary controller in a controller cluster having more than two controllers during normal operations (e.g., secondary, . . . , and nth controllers as depicted in FIG. 4). As stated above in FIG. 19, the Controllers TLV 2100B when included in a LSP (e.g., LSP 1100 in FIG. 11) advertises the information about the controller.

In the depicted embodiment, the Controllers TLV 2100B includes a Type field 2102B, a Length field 2104B, a Flags field 2106B, a C-bit field 2108B, a Position field 2110B, a NoControllers field 2112B, a OldPosition field 2114B, a Reserved field 2116B, a Priority field 2118B, and Controller ID field 2120B. The Type field 2102B is 8 bits and stores a value (TBD) that indicates that the data format is a Controllers TLV. The Length field 2104B is n*4+6 to indicate the length of the value portion of the Controllers TLV 2100B in octets, where n is the number of controllers in the controller cluster. The Flags field 2106B is 8 bits and includes the C-bit field 2108B. In the depicted embodiment, the C-bit field 2108B is set to 0 to indicate that the position of the advertising controller is not the position of the current active primary controller. The Position field 2110B is set to 2 to indicate that the controller that is advertising the LSP (i.e., Controller B 306 in FIG. 3) is currently in the second position in the controller cluster or group. The NoControllers field 2112B is set to n to indicate that there are n controllers (including itself) connected to the advertising controller. The OldPosition field 2114B is set to 2 to indicate the old position of the controller in the controller cluster prior to the controller cluster being split. In an embodiment, the Reserved field 2116B is set to zero for transmission and ignored for reception. The Priority field 2118B indicates the priority of the controller to be elected as a primary controller. The Controller ID field 2120B contains the controller IDs of the n controllers in the controller cluster or group (i.e., Controller A's ID, Controller B's ID, . . . , and Controller N's ID).

FIG. 22A is an example of a Controllers TLV 2200A in accordance with an embodiment of the present disclosure. The Controllers TLV 2200A depicts an example of the Controllers TLV 500 for a controller cluster having more than two controllers (e.g., primary, secondary, . . . , nth controller as depicted in FIG. 4). Specifically, the Controllers TLV 2200A depicts the controller information of the primary controller in a controller group (e.g., Controller A 402 in FIG. 4 in group 1) that has split from the controller cluster 410 having more than two controllers due to one or more network failures. The Controllers TLV 2200A when included in a RI LSA (e.g., as described in FIG. 7 and FIG. 8) advertises the information about the controller and the controller group of the controller to enable separated controller groups to obtain the controller information of the other groups to enable proper selection/election of a primary controller of the network.

In the depicted embodiment, the Controllers TLV 2200A includes a Type field 2202A, a Length field 2204A, a Flags field 2206A, a C-bit field 2208A, a Position field 2210A, a NoControllers field 2212A, a OldPosition field 2214A, a Reserved field 2216A, a Priority field 2218A, and Controller ID field 2220A. The Type field 2202A is 16 bits and stores a value (TBD) that indicates that the data format is a Controllers TLV. The Length field 2204A is 16 to indicate the length of the value portion of the Controllers TLV 2200A in octets. The Flags field 2206A is 8 bits and includes the C-bit field 2208A. In the depicted embodiment, the C-bit field 2208A is set to 0 to indicate that the position of the advertising controller is not the position of the current active primary controller. The Position field 2210A is set to 1 to indicate that the advertising controller is currently in the first position in the controller group 1. The NoControllers field 2212A is set to 2 to indicate that there are 2 controllers (including itself) connected to the advertising controller (i.e., total of 2 controllers in group 1). The OldPosition field 2214A is set to 1 to indicate the old position of the controller in the controller cluster prior to the controller cluster being split. The Reserved field 2216A is set to zero for transmission and ignored for reception. The Priority field 2218A indicates the priority of the controller to be elected as a primary controller. The Controller ID field 2220A contains the controller IDs of the 2 controllers in the controller group 1 (i.e., Controller A's ID and Controller C's ID).

FIG. 22B is an example of a Controllers TLV 2200B in accordance with an embodiment of the present disclosure. The Controllers TLV 2200B depicts an example of the Controllers TLV 500 for a controller cluster having more than two controllers (e.g., primary, secondary, . . . , nth controller as depicted in FIG. 4). Specifically, the Controllers TLV 2200B depicts the controller information of a secondary controller in a controller group (e.g., Controller B 404 in FIG. 4 in group 2) that has split from the controller cluster 410 having more than two controllers due to one or more network failures. The Controllers TLV 2200B when included in a RI LSA (e.g., as described in FIG. 7 and FIG. 8) advertises the information about the controller and the controller group of the controller to enable separated controller groups to obtain the controller information of the other groups to enable proper selection/election of a primary controller of the network.

In the depicted embodiment, the Controllers TLV 2200B includes a Type field 2202B, a Length field 2204B, a Flags field 2206B, a C-bit field 2208B, a Position field 2210B, a NoControllers field 2212B, a OldPosition field 2214B, a Reserved field 2216B, a Priority field 2218B, and Controller ID field 2220B. The Type field 2202B is 16 bits and stores a value (TBD) that indicates that the data format is a Controllers TLV. The Length field 2204B is 16 to indicate the length of the value portion of the Controllers TLV 2200B in octets. The Flags field 2206B is 8 bits and includes the C-bit field 2208B. In the depicted embodiment, the C-bit field 2208B is set to 0 to indicate that the position of the advertising controller is not the position of the current active primary controller. The Position field 2210B is set to 1 to indicate that the advertising controller is currently in the first position in the controller group 2. The NoControllers field 2212B is set to 2 to indicate that there are 2 controllers (including itself) connected to the advertising controller (i.e., total of 2 controllers in group 2). The OldPosition field 2214B is set to 2 to indicate the old position of the controller in the controller cluster prior to the controller cluster being split. The Reserved field 2216B is set to zero for transmission and ignored for reception. The Priority field 2218B indicates the priority of the controller to be elected as a primary controller. The Controller ID field 2220B contains the controller IDs of the 2 controllers in the controller group 2 (i.e., Controller B's ID and Controller N's ID).

Figure 23A:
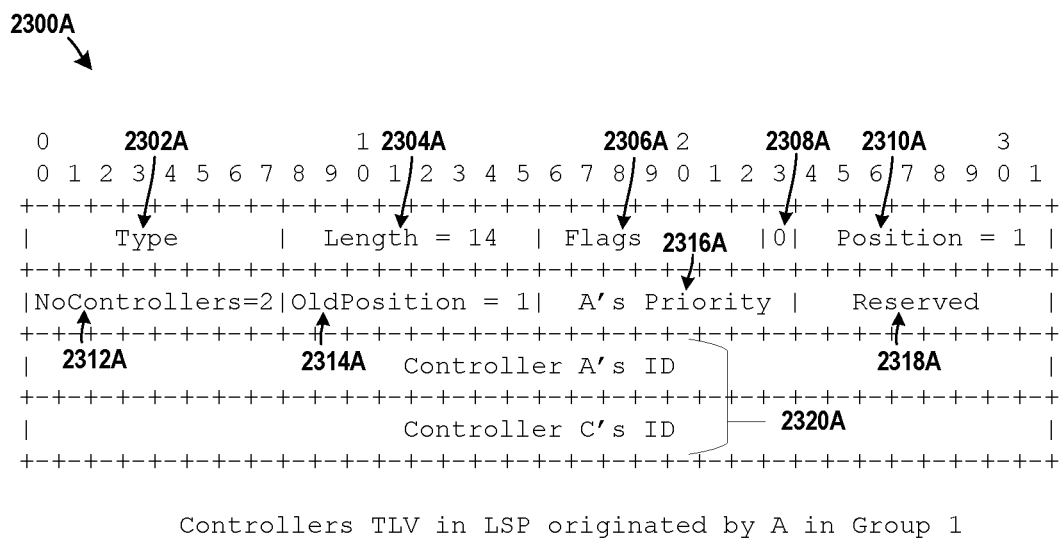
FIG. 23A is an example of a Controllers TLV in accordance with an embodiment of the present disclosure.

FIG. 23A is an example of a Controllers TLV 2300A in accordance with an embodiment of the present disclosure. The Controllers TLV 2300A depicts an example of the Controllers TLV 900 for a controller cluster having more than two controllers (e.g., primary, secondary, . . . , nth controller as depicted in FIG. 4). Specifically, the Controllers TLV 2300A depicts the controller information of the primary controller in a controller group (e.g., Controller A 402 in FIG. 4 in group 1) that has split from the controller cluster 410 having more than two controllers due to one or more network failures. The Controllers TLV 2300A when included in a LSP (e.g., LSP 1100 in FIG. 11) advertises the information about the controller and the controller group of the controller to enable separated controller groups to obtain the controller information of the other groups to enable proper selection/election of a primary controller of the network.

The Controllers TLV 2300A includes a Type field 2302A, a Length field 2304A, a Flags field 2306A, a C-bit field 2308A, a Position field 2310A, a NoControllers field 2312A, a OldPosition field 2314A, a Priority field 2316A, a Reserved field 2318A, and Controller ID field 2320A. The Type field 2302A specifies a type value (TBD) that indicates that the data format is a Controllers TLV. The Length field 2304A is 14 to indicate the length of the value portion of the Controllers TLV 2300A in octets. The Flags field 2306A can be used to indicate one or more flags. The C-bit field 2308A is set to 0 to indicate that the position of the advertising controller is not the position of the current active primary controller. The Position field 2310A is set to 1 to indicate that the advertising controller is currently in the first position in the controller group 1. The NoControllers field 2312A is set to 2 to indicate that there are 2 controllers (including itself) connected to the advertising controller (i.e., total of 2 controllers in group 1). The OldPosition field 2314A is set to 1 to indicate the old position of the controller in the controller cluster prior to the controller cluster being split. The Priority field 2316A indicates the priority of the controller to be elected as a primary controller. The Reserved field 2318A is set to zero for transmission and ignored for reception. The Controller ID field 2320A contains the controller IDs of the 2 controllers in the controller group 1 (i.e., Controller A's ID and Controller C's ID).

Figure 23B:
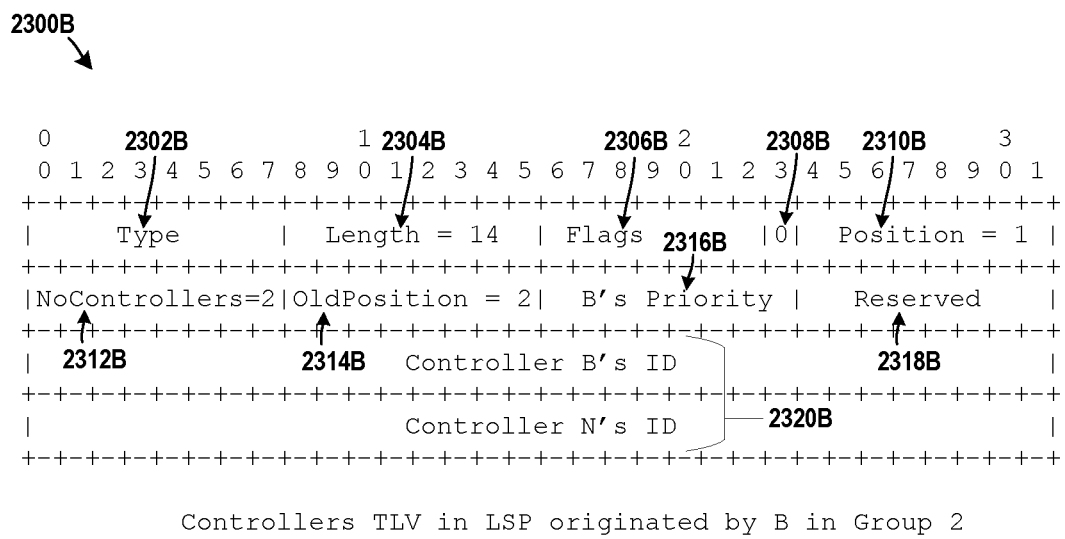
FIG. 23B is an example of a Controllers TLV in accordance with an embodiment of the present disclosure.

FIG. 23B is an example of a Controllers TLV 2300B in accordance with an embodiment of the present disclosure. The Controllers TLV 2300B depicts an example of the Controllers TLV 900 for a controller cluster having more than two controllers (e.g., primary, secondary, . . . , nth controller as depicted in FIG. 4). Specifically, the Controllers TLV 2300B depicts the controller information of the secondary controller in a controller group (e.g., Controller B 404 in FIG. 4 in group 2) that has split from the controller cluster 410 having more than two controllers due to one or more network failures. The Controllers TLV 2300B when included in a LSP (e.g., LSP 1100 in FIG. 11) advertises the information about the controller and the controller group of the controller to enable separated controller groups to obtain the controller information of the other groups to enable proper selection/election of a primary controller of the network.

The Controllers TLV 2300B includes a Type field 2302B, a Length field 2304B, a Flags field 2306B, a C-bit field 2308B, a Position field 2310B, a NoControllers field 2312B, a OldPosition field 2314B, a Priority field 2316B, a Reserved field 2318B, and Controller ID field 2320B. The Type field 2302B specifies a type value (TBD) that indicates that the data format is a Controllers TLV. The Length field 2304B is 14 to indicate the length of the value portion of the Controllers TLV 2300B in octets. The Flags field 2306B can be used to indicate one or more flags. The C-bit field 2308B is set to 0 to indicate that the position of the advertising controller is not the position of the current active primary controller. The Position field 2310B is set to 1 to indicate that the advertising controller is currently in the first position in the controller group 2. The NoControllers field 2312B is set to 2 to indicate that there are 2 controllers (including itself) connected to the advertising controller (i.e., total of 2 controllers in group 2). The OldPosition field 2314B is set to 2 to indicate the old position of the controller in the controller cluster prior to the controller cluster being split. The Priority field 2316B indicates the priority of the controller to be elected as a primary controller. The Reserved field 2318B is set to zero for transmission and ignored for reception. The Controller ID field 2320B contains the controller IDs of the 2 controllers in the controller group 2 (i.e., Controller B's ID and Controller N's ID).

FIG. 24 is an example of a Controllers TLV 2400 in accordance with an embodiment of the present disclosure. The Controllers TLV 2400 depicts an example of the Controllers TLV 500 for a controller cluster having more than two controllers (e.g., primary, secondary, . . . , nth controller as depicted in FIG. 4). Specifically, the Controllers TLV 2400 depicts the controller information of the primary controller in a controller group (e.g., Controller A 402 in FIG. 4 in group 1) that has split from the controller cluster 410 having more than two controllers due to one or more network failures. In the depicted embodiment, the controller group 1 is elected as the primary group among all the split groups of the original controller cluster. The Controllers TLV 2400 when included in a RI LSA (e.g., as described in FIG. 7 and FIG. 8) advertises the information about the controller and the controller group 1 to enable separated controller groups to obtain the controller information of group 1 so that they are aware of the controller/controller group 1 information.

The Controllers TLV 2400 includes a Type field 2402, a Length field 2404, a Flags field 2406, a C-bit field 2408, a Position field 2410, a NoControllers field 2412, a OldPosition field 2414, a Reserved field 2416, a Priority field 2418, and Controller ID field 2420. The Type field 2402 specifies a type value (TBD) that indicates that the data format is a Controllers TLV. The Length field 2404 is 16 to indicate the length of the value portion of the Controllers TLV 2400 in octets. The Flags field 2406 can be used to indicate one or more flags. The C-bit field 2408 is set to 1 to indicate that the position of the advertising controller is the position of the current active primary controller. The Position field 2410 is set to 1 to indicate that the advertising controller is currently in the first position in the controller group 1. The NoControllers field 2412 is set to 2 to indicate that there are 2 controllers (including itself) connected to the advertising controller (i.e., total of 2 controllers in group 1). The OldPosition field 2414 is set to 1 to indicate the old position of the controller in the controller cluster prior to the controller cluster being split. The Reserved field 2416 is set to zero for transmission and ignored for reception. The Priority field 2418 indicates the priority of the controller to be elected as a primary controller. The Controller ID field 2420 contains the controller IDs of the 2 controllers in the controller group 1 (i.e., Controller A's ID and Controller C's ID).

FIG. 25 is an example of a Controllers TLV 2500 in accordance with an embodiment of the present disclosure. The Controllers TLV 2500 depicts an example of the Controllers TLV 900 for a controller cluster having more than two controllers (e.g., primary, secondary, . . . , nth controller as depicted in FIG. 4). Specifically, the Controllers TLV 2500 depicts the controller information of the primary controller in a controller group (e.g., Controller A 402 in FIG. 4 in group 1) that has split from the controller cluster 410 having more than two controllers due to one or more network failures. In the depicted embodiment, the controller group 1 is elected as the primary group among all the split groups of the original controller cluster. The Controllers TLV 2500 when included in a LSP (e.g., LSP 1100 in FIG. 11) advertises the information about the controller and the controller group 1 to enable separated controller groups to obtain the controller information of group 1 so that they are aware of the controller/controller group 1 information.

The Controllers TLV 2500 includes a Type field 2502, a Length field 2504, a Flags field 2506, a C-bit field 2508, a Position field 2510, a NoControllers field 2512, a OldPosition field 2514, a Priority field 2516, a Reserved field 2518, and Controller ID field 2520. The Type field 2502 specifies a type value (TBD) that indicates that the data format is a Controllers TLV. The Length field 2504 is 14 to indicate the length of the value portion of the Controllers TLV 2500 in octets. The Flags field 2506 can be used to indicate one or more flags. The C-bit field 2508 is set to 1 to indicate that the position of the advertising controller is the position of the current active primary controller. The Position field 2510 is set to 1 to indicate that the advertising controller is currently in the first position in the controller group 1. The NoControllers field 2512 is set to 2 to indicate that there are 2 controllers (including itself) connected to the advertising controller (i.e., total of 2 controllers in group 1). The OldPosition field 2514 is set to 1 to indicate the old position of the controller in the controller cluster prior to the controller cluster being split. The Priority field 2516 indicates the priority of the controller to be elected as a primary controller. The Reserved field 2518 is set to zero for transmission and ignored for reception. The Controller ID field 2520 contains the controller IDs of the 2 controllers in the controller group 1 (i.e., Controller A's ID and Controller C's ID).

FIG. 26 is an example of a Controllers TLV 2600 in accordance with an embodiment of the present disclosure. The Controllers TLV 2600 depicts an example of the Controllers TLV 500 for a controller cluster having more than two controllers (e.g., primary, secondary, . . . , nth controller as depicted in FIG. 4). Specifically, the Controllers TLV 2600 depicts the controller information of the primary controller in a controller group (e.g., controller C 406 in FIG. 4 in group 1) that has split from the controller cluster 410 having more than two controllers due to one or more network failures including the failure of primary Controller A 402. In the depicted embodiment, the controller group 1 is not elected as the primary group among all the split groups of the original controller cluster and controller C being the only remaining controller in the controller group 1 is elected as the intent primary controller of the network. The Controllers TLV 2600 when included in a RI LSA (e.g., as described in FIG. 7 and FIG. 8) advertises the information about controller C and the controller group 1 to enable separated controller groups to obtain the controller information of group 1 so that they are aware of the controller/ controller group 1 information.

The Controllers TLV 2600 includes a Type field 2602, a Length field 2604, a Flags field 2606, a C-bit field 2608, a Position field 2610, a NoControllers field 2612, a OldPosition field 2614, a Reserved field 2616, a Priority field 2618, and Controller ID field 2620. The Type field 2602 specifies a type value (TBD) that indicates that the data format is a Controllers TLV. The Length field 2604 is 12 to indicate the length of the value portion of the Controllers TLV 2600 in octets. The Flags field 2606 can be used to indicate one or more flags. The C-bit field 2608 is set to 0 to indicate that the position of the advertising controller is not the position of the current active primary controller. The Position field 2610 is set to 1 to indicate that the advertising controller is currently in the first position in the controller group 1. The NoControllers field 2612 is set to 1 to indicate that there is 1 controller (i.e., itself) connected to the advertising controller (i.e., total of 1 controller in group 1). The OldPosition field 2614 is set to 3 to indicate the old position of the controller in the controller cluster prior to the controller cluster being split. The Reserved field 2616 is set to zero for transmission and ignored for reception. The Priority field 2618 indicates the priority of the controller to be elected as a primary controller. The Controller ID field 2620 contains the controller ID of the controllers in the controller group 1 (i.e., Controller C's ID).

FIG. 27 is an example of a Controllers TLV 2700 in accordance with an embodiment of the present disclosure. The Controllers TLV 2700 depicts an example of the Controllers TLV 500 for a controller cluster having more than two controllers (e.g., primary, secondary, . . . , nth controller as depicted in FIG. 4). Specifically, the Controllers TLV 2700 depicts the controller information of Controller B 404 in group 2 (Controller B 404 and Controller N 408 in FIG. 4) after the controller cluster 410 splits due to one or more network failures. In the depicted embodiment, the Controller B 404 is elected as the intent primary of group 2, but group 2 is not elected as the primary group of the split groups. Controller B 404, via its IGP proxy, originates an RI LSA (e.g., as described in FIG. 7 and FIG. 8) advertising the information about Controller B 404 and controller group 2 to enable separated controller groups to obtain the controller information of Controller B 404 and controller group 2.

The Controllers TLV 2700 includes a Type field 2702, a Length field 2704, a Flags field 2706, a C-bit field 2708, a Position field 2710, a NoControllers field 2712, a OldPosition field 2714, a Reserved field 2716, a Priority field 2718, and Controller ID field 2720. The Type field 2702 specifies a type value (TBD) that indicates that the data format is a Controllers TLV. The Length field 2704 is 16 to indicate the length of the value portion of the Controllers TLV 2700 in octets. The Flags field 2706 can be used to indicate one or more flags. The C-bit field 2708 is set to 0 to indicate that the position of the advertising controller (Controller B 404 in group 2) is not the position of the current active primary controller because group 2 is not elected as the primary group. The Position field 2710 is set to 1 to indicate that the advertising controller is currently in the first position in the controller group 2. The NoControllers field 2712 is set to 2 to indicate that there are 2 controllers (including itself) connected to the advertising controller (i.e., total of 2 controller in group 2). The OldPosition field 2714 is set to 2 to indicate the old position of the controller in the controller cluster prior to the controller cluster being split. The Reserved field 2716 is set to zero for transmission and ignored for reception. The Priority field 2718 indicates the priority of the controller to be elected as a primary controller. The Controller ID field 2720 contains the controller IDs of the controllers in the controller group 2 (i.e., Controller B's ID and Controller N's ID).

Figure 28:
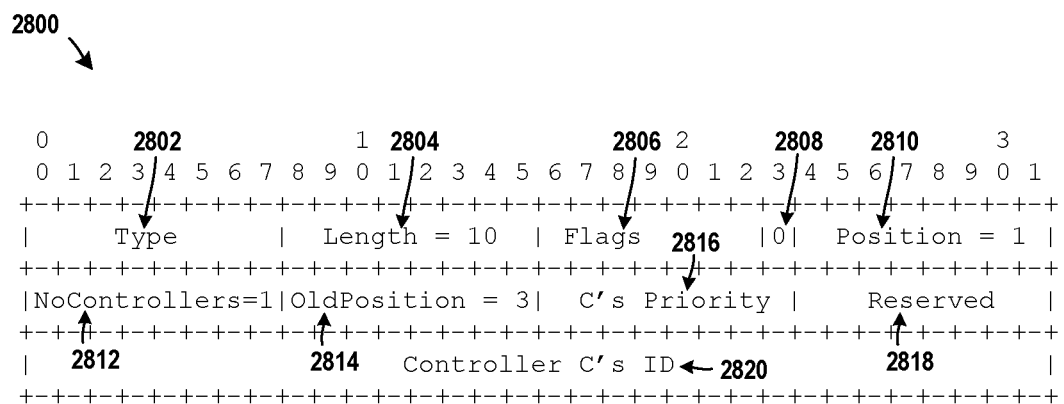
FIG. 28 is an example of a Controllers TLV in accordance with an embodiment of the present disclosure.

FIG. 28 is an example of a Controllers TLV 2800 in accordance with an embodiment of the present disclosure.

The Controllers TLV 2800 depicts an example of the Controllers TLV 900 for a controller cluster having more than two controllers (e.g., primary, secondary, . . . , nth controller as depicted in FIG. 4). Specifically, the Controllers TLV 2800 depicts the controller information of controller C 406 in FIG. 4 in group 1 after the controller cluster 410 splits due to one or more network failures including the failure of primary Controller A 402. In the depicted embodiment, the controller group 1 is not elected as the primary group among all the split groups of the original controller cluster. Controller C being the only remaining controller in the controller group 1 is elected as the intent primary controller of the network. The IGP proxy of the Controller C originates a LSP (e.g., LSP 1100 in FIG. 11) that includes the Controllers TLV 2800 to advertise the information about controller C and the controller group 1 to enable separated controller groups to obtain the controller information of controller C and the controller group 1.

The Controllers TLV 2800 includes a Type field 2802, a Length field 2804, a Flags field 2806, a C-bit field 2808, a Position field 2810, a NoControllers field 2812, a OldPosition field 2814, a Priority field 2816, a Reserved field 2818, and Controller ID field 2820. The Type field 2802 specifies a type value (TBD) that indicates that the data format is a Controllers TLV. The Length field 2804 is 10 to indicate the length of the value portion of the Controllers TLV 2800 in octets. The Flags field 2806 can be used to indicate one or more flags. The C-bit field 2808 is set to 0 to indicate that the position of the advertising controller is not the position of the current active primary controller. The Position field 2810 is set to 1 to indicate that the advertising controller is currently in the first position in the controller group 1. The NoControllers field 2812 is set to 1 to indicate that there is 1 controller (i.e., itself) connected to the advertising controller (i.e., total of 1 controller in group 1). The OldPosition field 2814 is set to 3 to indicate the old position of the controller in the controller cluster prior to the controller cluster being split. The Priority field 2816 indicates the priority of the controller to be elected as a primary controller. The Reserved field 2818 is set to zero for transmission and ignored for reception. The Controller ID field 2820 contains the controller ID of the controllers in the controller group 1 (i.e., Controller C's ID).

Figure 29:
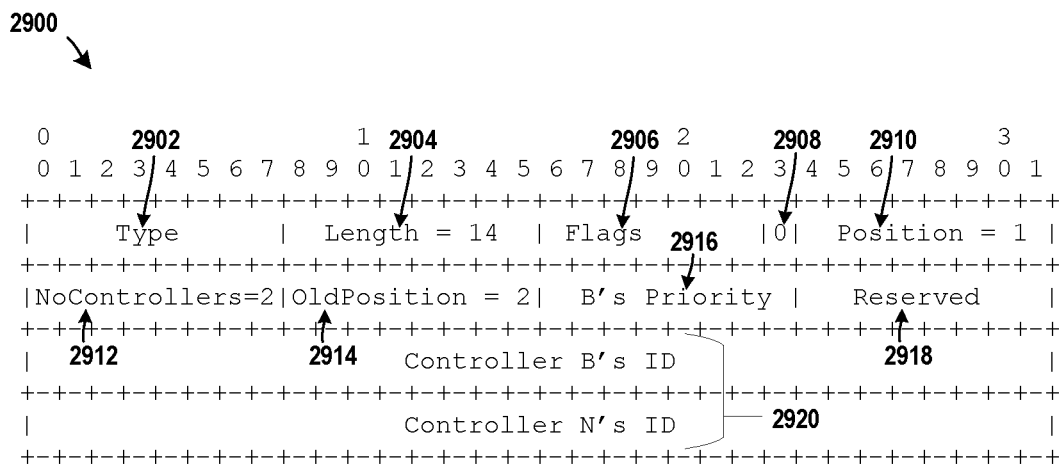
FIG. 29 is an example of a Controllers TLV in accordance with an embodiment of the present disclosure.

FIG. 29 is an example of a Controllers TLV 2900 in accordance with an embodiment of the present disclosure. The Controllers TLV 2900 depicts an example of the Controllers TLV 900 for a controller cluster having more than two controllers (e.g., primary, secondary, . . . , nth controller as depicted in FIG. 4). Specifically, the Controllers TLV 2900 depicts the controller information of Controller B 404 in group 2 (Controller B 404 and Controller N 408 in FIG. 4) after the controller cluster 410 splits due to one or more network failures. In the depicted embodiment, the Controller B 404 is elected as the intent primary of group 2, but group 2 is not elected as the primary group. Controller B 404, via its IGP proxy, originates an LSP (e.g., LSP 1100 in FIG. 11) that includes the Controllers TLV 2900 to advertise the information about Controller B 404 and controller group 2 to enable separated controller groups to obtain the controller information of Controller B 404 and controller group 2.

The Controllers TLV 2900 includes a Type field 2902, a Length field 2904, a Flags field 2906, a C-bit field 2908, a Position field 2910, a NoControllers field 2912, a OldPosition field 2914, a Priority field 2916, a Reserved field 2918, and Controller ID field 2920. The Type field 2902 specifies a type value (TBD) that indicates that the data format is a Controllers TLV. The Length field 2904 is 14 to indicate the length of the value portion of the Controllers TLV 2900 in octets. The Flags field 2906 can be used to indicate one or more flags. The C-bit field 2908 is set to 0 to indicate that the position of the advertising controller (Controller B 404 in group 2) is not the position of the current active primary controller because group 2 is not elected as the primary group. The Position field 2910 is set to 1 to indicate that the advertising controller is currently in the first position in the controller group 2. The NoControllers field 2912 is set to 2 to indicate that there are 2 controllers (including itself) connected to the advertising controller (i.e., total of 2 controller in group 2). The OldPosition field 2914 is set to 2 to indicate the old position of the controller in the controller cluster prior to the controller cluster being split. The Priority field 2916 indicates the priority of the controller to be elected as a primary controller. The Reserved field 2918 is set to zero for transmission and ignored for reception. The Controller ID field 2920 contains the controller IDs of the controllers in the controller group 2 (i.e., Controller B's ID and Controller N's ID).

FIG. 30 is an example of a Controllers TLV 3000 in accordance with an embodiment of the present disclosure. The Controllers TLV 3000 depicts an example of the Controllers TLV 500 for a controller cluster having more than two controllers (e.g., primary, secondary, . . . , nth controller as depicted in FIG. 4). Specifically, the Controllers TLV 3000 depicts the controller information of Controller B 404 in group 2 (Controller B 404 and Controller N 408 in FIG. 4) after the controller cluster 410 splits due to one or more network failures. In the depicted embodiment, the Controller B 404 is elected as the intent primary of group 2, and group 2 is elected as the primary group of the split groups. Controller B 404, via its IGP proxy, originates an RI LSA (e.g., as described in FIG. 7 and FIG. 8) advertising the information about Controller B 404 and controller group 2 to enable separated controller groups to obtain the controller information of Controller B 404 and controller group 2.

The Controllers TLV 3000 includes a Type field 3002, a Length field 3004, a Flags field 3006, a C-bit field 3008, a Position field 3010, a NoControllers field 3012, a OldPosition field 3014, a Reserved field 3016, a Priority field 3018, and Controller ID field 3020. The Type field 3002 specifies a type value (TBD) that indicates that the data format is a Controllers TLV. The Length field 3004 is 16 to indicate the length of the value portion of the Controllers TLV 3000 in octets. The Flags field 3006 can be used to indicate one or more flags. The C-bit field 3008 is set to 1 to indicate that the position of the advertising controller (Controller B 404 in group 2) is the position of the current active primary controller because group 2 is elected as the primary group. The Position field 3010 is set to 1 to indicate that the advertising controller is currently in the first position in the controller group 2, thus making the advertising controller the primary controller of the network. The NoControllers field 3012 is set to 2 to indicate that there are 2 controllers (including itself) connected to the advertising controller (i.e., total of 2 controller in group 2). The OldPosition field 3014 is set to 2 to indicate the old position of the controller in the controller cluster prior to the controller cluster being split. The Reserved field 3016 is set to zero for transmission and ignored for reception. The Priority field 3018 indicates the priority of the controller to be elected as a primary controller. The Controller ID field 3020 contains the controller IDs of the controllers in the controller group 2 (i.e., Controller B's ID and Controller N's ID).

Figure 31:
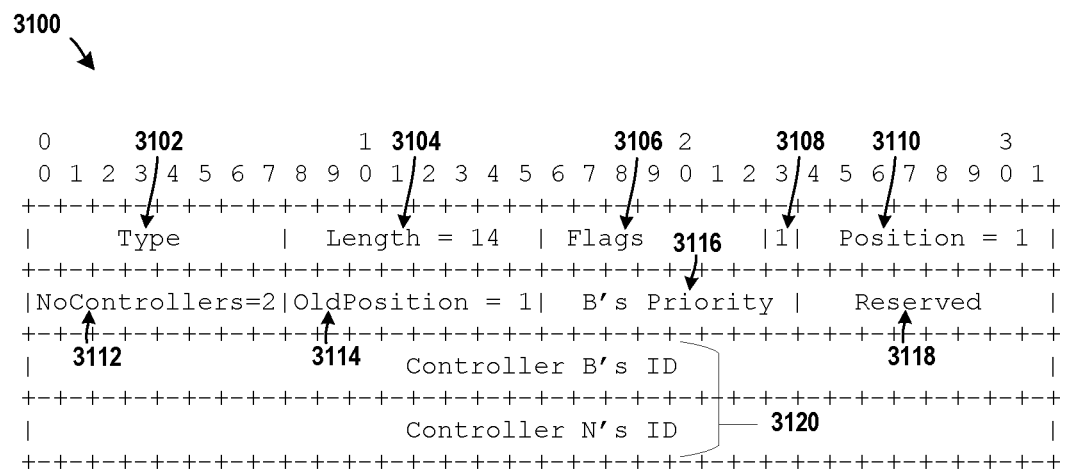
FIG. 31 is an example of a Controllers TLV in accordance with an embodiment of the present disclosure.

FIG. 31 is an example of a Controllers TLV 3100 in accordance with an embodiment of the present disclosure.

The Controllers TLV 3100 depicts an example of the Controllers TLV 900 for a controller cluster having more than two controllers (e.g., primary, secondary, . . . , nth controller as depicted in FIG. 4). Specifically, the Controllers TLV 3100 depicts the controller information of Controller B 404 in group 2 (Controller B 404 and Controller N 408 in FIG. 4) after the controller cluster 410 splits due to one or more network failures. In the depicted embodiment, the Controller B 404 is elected as the intent primary of group 2, and group 2 is elected as the primary group. Controller B 404, via its IGP proxy, originates an LSP (e.g., LSP 1100 in FIG. 11) that includes the Controllers TLV 3100 to advertise the information about Controller B 404 and controller group 2 to enable separated controller groups to obtain the controller information of Controller B 404 and controller group 2.

The Controllers TLV 3100 includes a Type field 3102, a Length field 3104, a Flags field 3106, a C-bit field 3108, a Position field 3110, a NoControllers field 3112, a OldPosition field 3114, a Priority field 3116, a Reserved field 3118, and Controller ID field 3120. The Type field 3102 specifies a type value (TBD) that indicates that the data format is a Controllers TLV. The Length field 3104 is 14 to indicate the length of the value portion of the Controllers TLV 3100 in octets. The Flags field 3106 can be used to indicate one or more flags. The C-bit field 3108 is set to 1 to indicate that the position of the advertising controller (Controller B 404 in group 2) is the position of the current active primary controller because group 2 is elected as the primary group. The Position field 3110 is set to 1 to indicate that the advertising controller is currently in the first position in the controller group 2. The NoControllers field 3112 is set to 2 to indicate that there are 2 controllers (including itself) connected to the advertising controller (i.e., total of 2 controller in group 2). The OldPosition field 3114 is set to 2 to indicate the old position of the controller in the controller cluster prior to the controller cluster being split. The Priority field 3116 indicates the priority of the controller to be elected as a primary controller. The Reserved field 3118 is set to zero for transmission and ignored for reception. The Controller ID field 3120 contains the controller IDs of the controllers in the controller group 2 (i.e., Controller B's ID and Controller N's ID).

Figure 32:
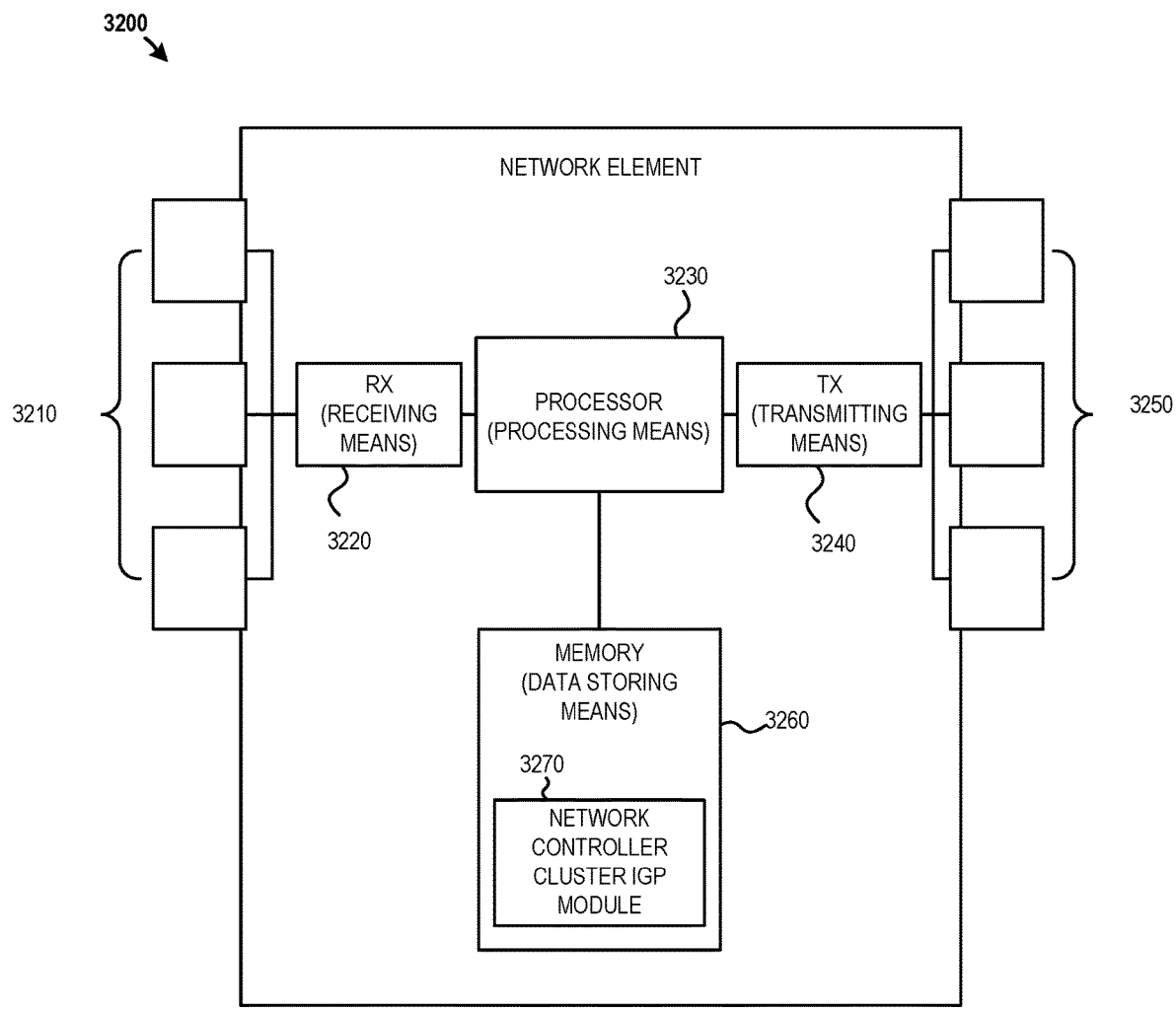
FIG. 32 is a schematic diagram illustrating a network element according to an embodiment of the present disclosure.

FIG. 32 is a schematic diagram illustrating a network element 3200 according to an embodiment of the present disclosure. The network element 3200 can be any network node such as, but not limited to, any router, switch, and controller, which are used by the service providers around world. In an embodiment, one or more of the controllers in FIG. 3 and FIG. 4 can be implemented using the network element 3200.

The network element 3200 includes receiver units (RX) 3220 or receiving means for receiving data via ingress ports 3210. The network element 3200 also includes transmitter units (TX) 3240 or transmitting means for transmitting via data egress ports 3250.

The network element 3200 includes a memory 3260 or data storing means for storing the instructions and various data. The memory 3260 can be any type of or combination of memory components capable of storing data and/or instructions. For example, the memory 3260 can include volatile and/or non-volatile memory such as read-only memory (ROM), random access memory (RAM), ternary content-addressable memory (TCAM), and/or static random-access memory (SRAM). The memory 3260 can also include one or more disks, tape drives, and solid-state drives. In some embodiments, the memory 3260 can be used as an over-flow data storage device to store programs when such programs are selected for execution, and to store instructions and data that are read during program execution.

The network element 3200 has one or more processor 3230 or other processing means (e.g., central processing unit (CPU)) to process instructions. The processor 3230 may be implemented as one or more CPU chips, cores (e.g., as a multi-core processor), field-programmable gate arrays (FPGAs), application specific integrated circuits (ASICs), and digital signal processors (DSPs). The processor 3230 is communicatively coupled via a system bus with the ingress ports 3210, RX 3220, TX 3240, egress ports 3250, and memory 3260. The processor 3230 can be configured to execute instructions stored in the memory 3260. Thus, the processor 3230 provides a means for performing any computational, comparison, determination, initiation, configuration, or any other action corresponding to the claims when the appropriate instruction is executed by the processor. In some embodiments, the memory 3260 can be memory that is integrated with the processor 3230.

In one embodiment, the memory 3260 stores a network controller cluster IGP module 3270. The network controller cluster IGP module 3270 includes data and executable instructions for implementing the disclosed embodiments. For instance, the network controller cluster IGP module 3270 can include instructions for implementing the methods described in FIG. 12 and FIG. 19. The inclusion of the network controller cluster IGP module 3270 substantially improves the functionality of the network element 3200 by ensuring that not more than one controller is issuing instructions to a network at the same time, thus improving network reliability.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method performed by a network controller of a controller cluster configured to control a network, the controller cluster comprising a plurality of network controllers, the method comprising:
   communicating, using an Interior Gateway Protocol (IGP) proxy, controller information about the network controller to one or more network elements in the network using IGP;
   establishing an IGP adjacency relationship between the IGP proxy of the network controller and the one or more network elements in the network;

advertising controller information about the network controller to the one or more network elements, wherein the controller information is included in a Controllers Type/Length/Value (TLV), and wherein the Controllers TLV includes a number of controllers field that indicates a number of controllers connected to the network controller;

detecting a communication failure within the controller cluster that splits in the controller cluster into a plurality of controller groups;

advertising updated controller information about the network controller to the one or more network elements, the updated controller information reflecting a change to the controller information in response to detecting the communication failure; and determining that the network controller is part of an elected primary group of the plurality of controller groups; and advertising second updated controller information about the network controller to the one or more network elements when the network controller is an intent primary controller of the elected primary group, the second updated controller information indicating that the network controller is a current active primary network controller of the network.

2. The method of claim 1, wherein the IGP adjacency relationship between the IGP proxy and one or more network elements in the network is established over a control channel.

3. The method of claim 1, wherein the Controllers TLV is included in one of an Open Shortest Path First Version 2 (OSPFv2) Router Informational (RI) Opaque Link-State Advertisement (LSA), OSPFv3 RI Opaque LSA, or an Intermediate System to Intermediate System (IS-IS) Link State Protocol Data Unit (LSP).

4. The method of claim 1, wherein the Controllers TLV includes a bit field and a position field, the bit field when set indicates that a position indicated in the position field is the position of a current active primary controller.

5. The method of claim 1, wherein the Controllers TLV includes an old position field that indicates a position of the network controller in the controller cluster prior to the controller cluster being split.

6. The method of claim 1, wherein the Controllers TLV includes a priority field that indicates a priority of the network controller to be elected as a primary network controller.

7. The method of claim 1, wherein the Controllers TLV includes a Controller Identifier (ID) field that includes controller IDs of all controllers in the controller cluster.

8. A network controller of a controller cluster, the controller cluster comprising a plurality of network controllers of a network, the network controller comprising:

a memory storing instructions; and one or more processors in communication with the memory, the one or more processors configured to execute the instructions to cause the network controller to:

communicate, using an Interior Gateway Protocol (IGP) proxy, controller information about the network controller using IGP;

establish an IGP adjacency relationship between the IGP proxy of the network controller and one or more network elements in the network;

advertise controller information about the network controller to the one or more network elements, wherein the controller information is included in a Controllers Type/Length/Value (TLV), and wherein the Controllers TLV includes a number of controllers field that indicates a number of controllers connected to the network controller;

detect a communication failure within the controller cluster that splits in the controller cluster into a plurality of controller groups;

advertise updated controller information about the network controller to the one or more network elements, the updated controller information reflecting a change to the controller information in response to detecting the communication failure; and determine that the network controller is part of an elected primary group of the plurality of controller groups; and advertise second updated controller information about the network controller to the one or more network elements when the network controller is an intent primary controller of the elected primary group, the second updated controller information indicating that the network controller is a current active primary network controller of the network.

9. The network controller of claim 8, wherein the IGP adjacency relationship between the IGP proxy of the network controller and one or more network elements in the network is established over a control channel.

10. The network controller of claim 8, wherein the Controllers TLV is included in one of an Open Shortest Path First Version 2 (OSPFv2) Router Informational (RI) Opaque Link-State Advertisement (LSA), OSPFv3 RI Opaque LSA, or an Intermediate System to Intermediate System (IS-IS) Link State Protocol Data Unit (LSP).

11. The network controller of claim 8, wherein the Controllers TLV includes a bit field and a position field, the bit field when set indicates that a position indicated in the position field is the position of a current active primary controller.

12. The network controller of claim 8, wherein the Controllers TLV includes an old position field that indicates a position of the network controller in the controller cluster prior to the controller cluster being split.

13. The network controller of claim 8, wherein the Controllers TLV includes a priority field that indicates a priority of the network controller to be elected as a primary network controller.

14. The network controller of claim 8, wherein the Controllers TLV includes a Controller Identifier (ID) field that includes controller IDs of all controllers in the controller cluster.

15. A network controller comprising:

a memory storing instructions; and one or more processors in communication with the memory, the one or more processors configured to execute the instructions to cause the network controller to:

configure the network controller as a secondary network controller in a controller cluster;

establish an Interior Gateway Protocol (IGP) adjacency relationship between an IGP proxy of the network controller and one or more network elements in the network;

advertise controller information about the network controller to the one or more network elements, wherein the controller information is included in a Controllers Type/Length/Value (TLV), and wherein the Controllers TLV includes a number of controllers field that indicates a number of controllers connected to the network controller;

detect a communication failure with a primary network controller in the controller cluster;

advertise updated controller information about the network controller to the one or more network elements, the updated controller information reflecting a change to the controller information in response to detecting the communication failure;

determine that the primary network controller has failed; and advertise second updated controller information about the network controller to the one or more network elements when the primary network controller has failed, the second updated controller information promoting the network controller from the secondary network controller to the primary network controller in the controller cluster.

16. The network controller according to claim 15, wherein determining that the primary network controller has failed comprises using a link state database (LSDB) in the IGP proxy to determine whether the IGP proxy is advertising the controller information to the one or more network elements in the network.

* * * * *